United States Patent
Chang et al.

(10) Patent No.: US 10,499,207 B2
(45) Date of Patent: Dec. 3, 2019

(54) SERVICE PROVIDING SYSTEM INCLUDING DISPLAY DEVICE AND MOBILE DEVICE, AND METHOD FOR PROVIDING SERVICE USING THE SAME

(71) Applicant: SAMSUNG ELECTRONICS CO., LTD., Suwon-si (KR)

(72) Inventors: Il-ku Chang, Seongnam-si (KR); Young-ho Rhee, Yongin-si (KR); Young-kyu Jin, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/913,977

(22) Filed: Jun. 10, 2013

(65) Prior Publication Data

US 2013/0331147 A1   Dec. 12, 2013

Related U.S. Application Data

(60) Provisional application No. 61/658,095, filed on Jun. 11, 2012.

(30) Foreign Application Priority Data

Jan. 2, 2013   (KR) .................. 10-2013-0000322
Feb. 4, 2013   (KR) .................. 10-2013-0012264
Feb. 6, 2013   (KR) .................. 10-2013-0013480

(51) Int. Cl.
*G01C 21/36* (2006.01)
*H04W 4/18* (2009.01)
(Continued)

(52) U.S. Cl.
CPC .......... *H04W 4/18* (2013.01); *G01C 21/3608* (2013.01); *G01C 21/3697* (2013.01);
(Continued)

(58) Field of Classification Search
CPC ...... G06F 17/00; G06F 3/0482; G06F 3/0484; H04W 4/18; H04W 4/02; H04W 4/046;
(Continued)

(56) References Cited

U.S. PATENT DOCUMENTS 6,810,323 B1   10/2004   Bullock et al.
6,963,294 B2   11/2005   Kurosawa
(Continued)

FOREIGN PATENT DOCUMENTS

CN   1661330 A   8/2005
CN   1661604 A   8/2005
(Continued)

OTHER PUBLICATIONS

Communication, dated Oct. 15, 2013, issued by the European Patent Office in counterpart European Application No. 13169437.4.
(Continued)

*Primary Examiner* — Lester G Kincaid
*Assistant Examiner* — Dung L Lam
(74) *Attorney, Agent, or Firm* — Sughrue Mion, PLLC

(57) ABSTRACT

A display device provided to a vehicle includes a communication unit which communicates with a mobile device, a control unit which acquires a keyword in a call conversation if the mobile device makes a call, and a display unit which displays additional information corresponding to the keyword. Accordingly, the display device can provide the user with services corresponding to keywords of the call conversation with convenience.

16 Claims, 21 Drawing Sheets

(51) Int. Cl.
*H04M 3/487* (2006.01)
*H04M 1/60* (2006.01)

(52) U.S. Cl.
CPC ........ *H04M 3/4872* (2013.01); *H04M 1/6091* (2013.01); *H04M 3/4878* (2013.01); *H04M 2250/74* (2013.01)

(58) Field of Classification Search
CPC ........ H04B 7/00; G01C 21/262; G01C 21/00; G01C 21/34; G01C 21/3608; G01C 21/3697; H04M 1/6083; H04M 3/42348; H04M 3/4878; B60W 2050/0077; B60W 50/14; H04L 67/22
USPC ........... 340/7.52; 704/270; 455/414.3, 414.4, 455/556.1, 557; 701/2, 36, 202, 24, 25, 701/430
See application file for complete search history.

(56) References Cited

U.S. PATENT DOCUMENTS

| | | | |
|---|---|---|---|
| 7,697,917 | B2 | 4/2010 | Camp, Jr. et al. |
| 7,805,740 | B2 | 9/2010 | Gilboa et al. |
| 7,853,403 | B2 | 12/2010 | Tanaka |
| 7,933,609 | B2 | 4/2011 | Lagerstedt et al. |
| 8,090,367 | B2 * | 1/2012 | Kameyama ............. H04L 67/22 |
| | | | 379/406.02 |
| 8,121,779 | B2 | 2/2012 | Kon et al. |
| 8,126,712 | B2 | 2/2012 | Mukaigaito et al. |
| 8,145,417 | B1 | 3/2012 | Chitre et al. |
| 8,346,277 | B2 | 1/2013 | Kim et al. |
| 8,352,178 | B2 | 1/2013 | Allen et al. |
| 8,411,830 | B2 * | 4/2013 | Gilbert et al. ............. 379/93.01 |
| 8,583,364 | B2 * | 11/2013 | Paik et al. ..................... 701/425 |
| 8,635,243 | B2 * | 1/2014 | Phillips et al. ................ 707/769 |
| 8,825,362 | B2 * | 9/2014 | Kirsch .......................... 701/430 |
| 9,026,940 | B2 | 5/2015 | Jung et al. |
| 9,129,460 | B2 | 9/2015 | McClellan et al. |
| 2004/0225712 | A1 | 11/2004 | Tajima et al. |
| 2005/0070327 | A1 | 3/2005 | Watanabe |
| 2006/0173859 | A1 | 8/2006 | Kim et al. |
| 2006/0223518 | A1 | 10/2006 | Haney |
| 2007/0249406 | A1 | 10/2007 | Andreasson |
| 2007/0271367 | A1 | 11/2007 | Yardni et al. |
| 2008/0064446 | A1 | 3/2008 | Camp et al. |
| 2008/0134043 | A1 | 6/2008 | Georgis et al. |
| 2008/0167813 | A1 * | 7/2008 | Geelen ............... G01C 21/3641 |
| | | | 701/469 |
| 2008/0200189 | A1 | 8/2008 | Lagerstedt et al. |
| 2008/0208462 | A1 | 8/2008 | Tanaka |
| 2008/0250026 | A1 | 10/2008 | Linden et al. |
| 2008/0319602 | A1 | 12/2008 | McClellan et al. |
| 2009/0005072 | A1 | 1/2009 | Forstall et al. |
| 2009/0018832 | A1 | 1/2009 | Mukaigaito et al. |
| 2009/0054086 | A1 | 2/2009 | Kim et al. |
| 2009/0055273 | A1 | 2/2009 | Miyazawa |
| 2009/0157298 | A1 | 6/2009 | Kon et al. |
| 2009/0182587 | A1 | 7/2009 | Lewis |
| 2010/0004005 | A1 | 1/2010 | Pereira et al. |
| 2010/0009719 | A1 * | 1/2010 | Oh .................... H04M 1/72583 |
| | | | 455/563 |
| 2010/0030463 | A1 | 2/2010 | Tomizawa |
| 2010/0081475 | A1 * | 4/2010 | Chiang ................. G06F 3/0483 |
| | | | 455/564 |
| 2010/0138153 | A1 | 6/2010 | Abe et al. |
| 2010/0161215 | A1 | 6/2010 | Karani |
| 2010/0299142 | A1 | 11/2010 | Freeman et al. |
| 2011/0015858 | A1 | 1/2011 | Takagi et al. |
| 2011/0043652 | A1 * | 2/2011 | King ................... G06F 17/2288 |
| | | | 348/222.1 |
| 2011/0054770 | A1 | 3/2011 | Allen et al. |
| 2011/0093520 | A1 | 4/2011 | Doyle et al. |
| 2011/0105097 | A1 | 5/2011 | Tadayon et al. |
| 2011/0238289 | A1 | 9/2011 | Lehmann et al. |
| 2011/0242269 | A1 * | 10/2011 | Nothlings ................ H04N 5/45 |
| | | | 348/14.05 |
| 2012/0053966 | A1 | 3/2012 | Kolodziej |
| 2012/0096403 | A1 | 4/2012 | Jung et al. |
| 2012/0135714 | A1 | 5/2012 | King, II |
| 2012/0143496 | A1 | 6/2012 | Chitre et al. |
| 2012/0200571 | A1 * | 8/2012 | Newell .................. G06F 3/1454 |
| | | | 345/428 |
| 2013/0225205 | A1 | 8/2013 | Haney |
| 2013/0226453 | A1 | 8/2013 | Trussel et al. |
| 2014/0018097 | A1 * | 1/2014 | Goldstein ........... G06F 19/3406 |
| | | | 455/456.1 |
| 2014/0129136 | A1 | 5/2014 | Celia |
| 2015/0017956 | A1 * | 1/2015 | Jeong ...................... H04M 1/57 |
| | | | 455/414.1 |
| 2015/0168154 | A1 | 6/2015 | Boerger |
| 2016/0110028 | A1 * | 4/2016 | Choi .................... G06F 9/4443 |
| | | | 715/733 |

FOREIGN PATENT DOCUMENTS

| | | |
|---|---|---|
| CN | 1723682 A | 1/2006 |
| CN | 1811848 A | 8/2006 |
| CN | 101373139 A | 2/2009 |
| CN | 101458091 A | 6/2009 |
| CN | 101507250 A | 8/2009 |
| CN | 101596903 A | 12/2009 |
| CN | 101647300 A | 2/2010 |
| CN | 101675320 A | 3/2010 |
| CN | 101785038 A | 7/2010 |
| CN | 101833570 A | 9/2010 |
| CN | 102090079 A | 6/2011 |
| CN | 102419851 A | 4/2012 |
| CN | 102457617 A | 5/2012 |
| EP | 1 274 056 A2 | 1/2003 |
| EP | 2 028 506 A1 | 2/2009 |
| EP | 2028448 A2 | 2/2009 |
| EP | 2164237 A1 | 3/2010 |
| EP | 2442539 A1 | 4/2012 |
| JP | H 10-089989 A | 4/1998 |
| JP | 2000-28377 A | 1/2000 |
| JP | 2002207841 A | 7/2002 |
| JP | 2003-209601 A | 7/2003 |
| JP | 2004251692 A | 9/2004 |
| JP | 200520259 A | 1/2005 |
| JP | 2005100276 A | 4/2005 |
| JP | 2005221285 A | 8/2005 |
| JP | 2005326775 A | 11/2005 |
| JP | 2006-85565 A | 3/2006 |
| JP | 3758179 B2 | 3/2006 |
| JP | 2006-190296 A | 7/2006 |
| JP | 2008305239 A | 12/2008 |
| JP | 2009037498 A | 2/2009 |
| JP | 2009-234465 A | 10/2009 |
| JP | 2010-502116 A | 1/2010 |
| JP | 201054484 A | 3/2010 |
| JP | 2010236858 A | 10/2010 |
| JP | 2010287048 A | 12/2010 |
| JP | 2011004143 A | 1/2011 |
| KR | 10-2005-0098386 A | 10/2005 |
| KR | 10-0559986 B1 | 3/2006 |
| KR | 10-2006-0077988 A | 7/2006 |
| KR | 1020060094177 A | 8/2006 |
| KR | 10-2006-0120346 A | 11/2006 |
| KR | 10-2007-0075435 A | 7/2007 |
| KR | 1020080003489 A | 1/2008 |
| KR | 10-2009-0094295 A | 9/2009 |
| KR | 1020090108821 A | 10/2009 |
| KR | 1020110024170 A | 3/2011 |
| KR | 10-2011-0055204 A | 5/2011 |
| KR | 10-1042126 B1 | 6/2011 |
| KR | 10-2011-0124966 A | 11/2011 |
| KR | 1020110124966 A | 11/2011 |
| KR | 10-2012-0049058 A | 5/2012 |
| WO | 2008/027076 A1 | 3/2008 |
| WO | 2008/064267 A2 | 5/2008 |

(56) References Cited

FOREIGN PATENT DOCUMENTS

| WO | 2006085565 A1 | 6/2008 |
| WO | 2011/035390 A1 | 3/2011 |
| WO | 2011/053304 A1 | 5/2011 |

OTHER PUBLICATIONS

Communication, dated Oct. 30, 2013, issued by the European Patent Office in counterpart European Patent Application No. 13171460.2.
Communication, dated Oct. 30, 2013, issued by the European Patent Office in counterpart European Patent Application No. 13171404.0.
Communication dated Jun. 10, 2014, issued by the European Patent Office in counterpart European Application No. 13171404.0.
Communication dated Nov. 21, 2014, issued by the United States Patent and Trademark Office in counterpart U.S. Appl. No. 13/915,032.
Communication dated Jun. 9, 2015, issued by the U.S. Patent Office for U.S. Appl. No. 13/915,032.
Communication dated Aug. 23, 2016, issued by the European Patent Office in counterpart European Patent Application No. 13804450.8.
USPTO Office Action dated Oct. 6, 2015 issued in co-pending U.S. Appl. No. 13/915,032.
USPTO Office Action dated Oct. 28, 2015 issued in co-pending U.S. Appl. No. 13/914,892.
U.S. Office Action dated Mar. 28, 2016, issued by the United States Patent and Trademark Office in counterpart U.S. Appl. No. 13/914,892.
U.S. Office Action dated Apr. 29, 2016, issued by the United States Patent and Trademark Office in counterpart U.S. Appl. No. 13/915,032.
Communication dated Dec. 15, 2016, issued by the United States Patent and Trademark Office in counterpart U.S. Appl. No. 13/915,032.
Communication dated Jan. 1, 2017, issued by the United States Patent and Trademark Office in counterpart U.S. Appl. No. 13/914,892.
Communication dated Feb. 16, 2017, issued by the Korean Intellectual Property Office in counterpart Korean Patent Application No. 10-2013-0062202.
Communication dated Feb. 27, 2017 issued by the European Patent Office in counterpart European Patent Application No. 13804450.8.
Office Action dated Feb. 28, 2017, issued by the State Intellectual Property Office of the People's Republic of China in counterpart Chinese Patent Application No. 201310233995.1.
Office Action dated Mar. 10, 2017, issued by the State Intellectual Property Office of the People's Republic of China in counterpart Chinese Patent Application No. 201380030871.1.
Communication dated Apr. 19, 2017, issued by the State Intellectual Property Office of the People's Republic of China in counterpart Chinese Patent Application No. 201310229339.4.
Communication dated May 10, 2017, issued by the Korean Intellectual Property Office in counterpart Korean Patent Application No. 10-2013-0062298.
Communication dated May 24, 2017, issued by the United States Patent and Trademark Office in counterpart U.S. Appl. No. 13/914,892.
Communication dated Jun. 2, 2017, issued by the State Intellectual Property Office of P.R. China in counterpart Chinese Application No. 201310231161.7.
Communication dated Jun. 16, 2017, issued by the United States Patent and Trademark Office in counterpart U.S. Appl. No. 13/915,032.
Communication dated Jul. 14, 2017, issued by the Japanese Patent Office in counterpart Japanese Application No. 2013-122764.
Communication dated Jul. 31, 2017, issued by the Japanese Patent Office in counterpart Japanese Application No. 2013-122761.
Communication issued by the State Intellectual Property Office of P.R. China dated Oct. 11, 2017 in counterpart Chinese Patent Application No. 201380030871.1.
Communication dated Feb. 16, 2018, issued by the USPTO in counterpart U.S. Appl. No. 13/914,892.
Communication dated Apr. 2, 2018, from the Japanese Patent Office in counterpart application No. 2013-122764.
Communication dated Apr. 16, 2018, from the Japanese Patent Office in counterpart application No. 2013-122761.
Communication dated Feb. 5, 2018, from the State Intellectual Property Office of People's Republic of China in counterpart Application No. 201310229339.4.
Communication dated Feb. 26, 2018, from the State Intellectual Property Office of People's Republic of China in counterpart Application No. 201310231161.7.
Communication dated May 3, 2018, issued by the State Intellectual Property of P.R. China in counterpart Chinese Application No. 201380030871.1.
Communication dated Jun. 5, 2018, issued by the Korean Intellectual Property Office in counterpart Korean Application No. 10-2018-0020713.
Office Action dated Jul. 5, 2018, issued by the United States Patent and Trademark Office in counterpart U.S. Appl. No. 13/914,892.
Communication dated Oct. 9, 2018, from the State Intellectual Property Office of People's Republic of China in counterpart Application No. 201310229339.4.
Communication dated Aug. 27, 2018, from the State Intellectual Property Office of People's Republic of China in counterpart Application No. 201310231161.7.
Communication dated Nov. 19, 2018 issued by the Korean Intellectual Property Office in counterpart Korean Application No. 10-2013-0013480.
Communication dated Dec. 13, 2018 issued by the Korean Intellectual Property Office in counterpart Korean Application No. 10-2018-0020713.
Communication dated Feb. 26, 2019, issued by the United States Patent Office in counterpart U.S. Appl. No. 13/914,892.
Communication dated Mar. 5, 2019, issued by the Chinese Patent Office in counterpart Chinese Application No. 201310229339.4.
Communication dated Apr. 8, 2019, issued by the Korean Patent Office in counterpart Korean Application No. 10-2013-0066380.
Communication dated May 30, 2019 issued by the Korean Patent Office in counterpart Korean Application No. 10-2013-0013480.
Communication dated Jun. 5, 2019, issued by the State Intellectual Property Office of P.R. China in counterpart Chinese Application No. 201310229339.4.
Communication dated Jun. 20, 2019, issued by the Korean Intellectual Property Office in counterpart Korean Application No. 10-2013-0066380.
Communication dated Jun. 27, 2019 issued by the Korean Intellectual Property Office in counterpart Korean Application No. 10-2018-0020713.
Communication dated Jun. 27, 2019, issued by the Korean Intellectual Property Office in corresponding Korean Application No. 10-2018-0020713.
Communication dated Aug. 27, 2019, issued by the Korean Patent Office in counterpart Korean Patent Application No. 10-2018-0020713.
Communication dated Aug. 1, 2019, issued by the Korean Patent Office in counterpart Korean Patent Application No. 10-2013-0013480.
Communication dated Aug. 9, 2019, issued by the United States Patent Office in counterpart U.S. Appl. No. 13/914,892.

* cited by examiner (1)

(2)

(3)

(1)

(2)

SERVICE PROVIDING SYSTEM INCLUDING DISPLAY DEVICE AND MOBILE DEVICE, AND METHOD FOR PROVIDING SERVICE USING THE SAME

CROSS-REFERENCE TO RELATED APPLICATIONS

This application claims priority from Korean Patent Application Nos. 10-2013-0000322, filed on Jan. 2, 2013, 10-2013-0012264, filed on Feb. 4, 2013, and 10-2013-0013480, filed on Feb. 6, 2013, in the Korean Intellectual Property Office, and U.S. Provisional Application No. 61/658,095, filed on Jun. 11, 2012, in the United States Patents and Trademark Office, the disclosures of which are incorporated herein by reference in their entireties.

BACKGROUND

Field

Apparatuses and methods consistent with exemplary embodiments relate to a service providing system which includes a display device and a mobile device, and a method for providing a service using the same, and more particularly, to a service providing system which includes a display device for conveniently providing a service related to, in particular, a call conversation, and a mobile device, and a method for providing a service using the same.

Description of the Related Art

Recently, due to development of communications technology and technology of electronic devices, diverse portable terminal devices and display devices have developed. A large number of people have personal portable terminal devices, and display devices which perform diverse functions are installed in vehicles or on the streets.

A display device installed in vehicles displays state information of the car and menus such as temperature control so that the user may input a control command. In addition, the display device installed in vehicles may have a navigation function so that it helps the user easily find a road. A personal portable communication device enables the user to transmit and receive phone calls or text messages.

While driving a car, the user may talk on the phone, try to call a third party, or change a destination. In general, in order to try to call a third party, the user may input the third party's phone number to the user's portable communication device or search for the third party from a stored phone number list and contact the found telephone number. In order to change a destination, the user may input a destination to a display device, search for the destination, and select the found destination. In a particular situation such as driving, this input and searching process may incur a risk and make typos while inputting information on the third party or the destination. Accordingly, there is a growing need for convenience when trying to call somebody or when changing a destination while driving.

In addition, when the user talks on the phone, they generally talk about their interests. Accordingly, the user may wish to receive information on their interests without searching for the information.

Therefore, there is a growing need for conveniently making a call, changing a destination, or receiving information on their interests using the display device.

SUMMARY

Exemplary embodiments overcome the above disadvantages and other disadvantages not described above. Also, exemplary embodiments are not required to overcome the disadvantages described above, and an exemplary embodiment may not overcome any of the problems described above.

An exemplary embodiment provides a service providing system which includes a display device capable of displaying additional information based on a call conversation of the user and conveniently providing a corresponding service, and a mobile device, and a method for providing a service using the same.

According to an aspect of an exemplary embodiment, a display device which is provided at a vehicle, the display device comprises a communicator configured to communicate with a mobile device, a controller configured to acquire at least one keyword in a call conversation if the mobile device makes a call, and a display configured to display additional information corresponding to the at least one keyword.

The additional information may comprise advertisement information corresponding to the at least one keyword, if a server configured to store an advertisement database transfers the advertisement information corresponding to the at least one keyword, the communicator receives the transferred advertisement information through the mobile device, and the controller displays the received advertisement information using the display.

If the displayed additional information is selected, the controller may provide a service corresponding to the selected additional information.

The additional information may comprise at least one from among location information, contact information, multimedia content, and advertisement information, and if the location information is selected, the controller provides a navigation service for guiding a route to a destination corresponding to the location information, if the contact information is selected, the controller provides a call service for making a call to the contact information, if the multimedia content is selected, the controller provides a service for reproducing the multimedia content, and if the advertisement information is selected, the controller provides an advertisement service for displaying a screen including the advertisement information.

The display device may further comprise a storage, wherein the controller searches for the additional information corresponding to the at least one keyword from among information which is stored in at least one from among a server, the mobile device, another mobile device which is connected to the mobile device for call, and the storage.

If the call conversation of the mobile device is received through the communicator, the controller may extract and acquire the at least one keyword from the call conversation and search for the additional information based on the at least one keyword.

According to another aspect of an exemplary embodiment, a mobile device includes a communicator configured to communicate with a display device provided at a vehicle, a call connector configured to make a call to another mobile device, and a controller configured to transfer a call conversation to a server, receives advertisement information corresponding to at least one keyword in the call conversation, and transfers the advertisement information to the display device.

According to yet another aspect of an exemplary embodiment, a service providing system includes a mobile device configured to make a call to another mobile device, and a display device configured to communicate with the mobile device and acquire at least one keyword in a call conversation if the mobile device makes the call to the another mobile device, wherein the display device displays additional information corresponding to the at least one keyword.

According to yet another aspect of an exemplary embodiment, a method for providing a service using a display device is provided. The method includes communicating with a mobile device, acquiring at least one keyword in a call conversation if the mobile device makes a call, and displaying additional information corresponding to the at least one keyword.

The additional information may comprise advertisement information corresponding to the at least one keyword, if a server which stores an advertisement database transfers the advertisement information corresponding to the at least one keyword, receiving the transferred advertisement information through the mobile device, and displaying the received advertisement information.

The method may further include if the displayed additional information is selected, providing a service corresponding to the selected additional information.

The additional information may comprise at least one from among location information, contact information, multimedia content, and advertisement information, and in the providing of the service, if the location information is selected, a navigation service for guiding a route to a destination corresponding to the location information, if the contact information is selected, a call service for making a call related to the contact information is provided, if the multimedia content is selected, a service for reproducing the multimedia content is provided, and if the advertisement information is selected, an advertisement service for displaying a screen including the advertisement information is provided.

The method may further comprise searching for the additional information corresponding to the at least one keyword from among information which is stored in at least one of a server, the mobile device, another mobile device which is connected to the mobile device, and a storage.

The method may further comprise if the call conversation of the mobile device is received, extracting and acquiring the at least one keyword from the call conversation and searching for the additional information based on the at least one keyword.

According to another aspect of an exemplary embodiment, a method for providing a service using a mobile device includes communicating with a display device provided at a vehicle, making a call to another mobile device, and transferring a call conversation to a server, receiving advertisement information corresponding to at least one keyword in the call conversation, and transferring the advertisement information to the display device.

According to an aspect of an exemplary embodiment, the server may categorize at least the call conversation according to users. Also, the received advertisement information may be displayed after an end of the call conversation.

According to the diverse exemplary embodiments, a service providing system which includes a display device and a mobile device may display additional information based on a call conversation of the user and provide a corresponding service.

Additional and/or other aspects and advantages of the exemplary embodiments will be set forth in part in the description which follows and, in part, will be obvious from the description, or may be learned by practice of the invention.

BRIEF DESCRIPTION OF THE DRAWING FIGURES

The above and/or other aspects of the exemplary embodiments will be more apparent with reference to the accompanying drawings, in which.

DETAILED DESCRIPTION OF THE EXEMPLARY EMBODIMENTS

Figure 1:
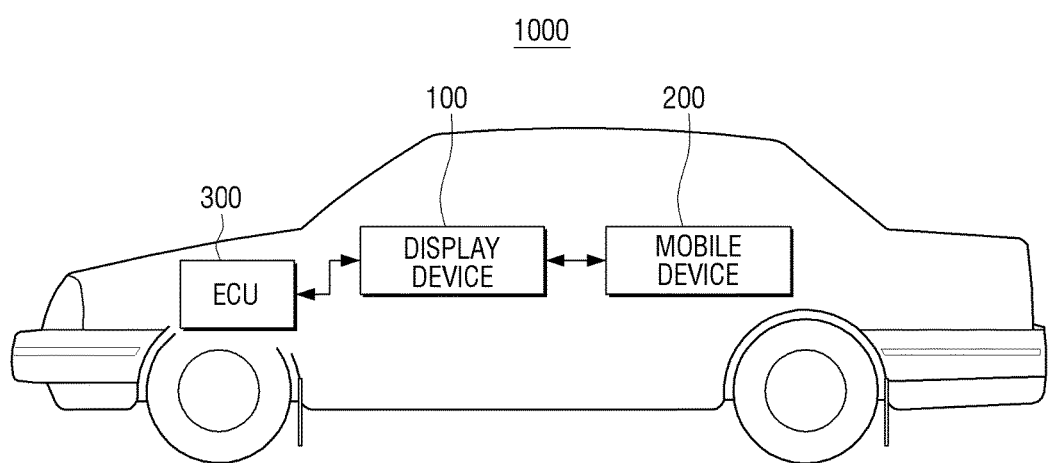
FIG. 1 illustrates a service providing system which is applied to a vehicle according to an exemplary embodiment.

Certain exemplary embodiments will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the invention with unnecessary detail.

FIG. 1 illustrates a service providing system which is applied to a vehicle according to an exemplary embodiment.

With reference to FIG. 1, the service providing system 1000 may include a display device 100, a mobile device 200, and an electronic control unit (ECU) 300.

The display device 100 may be built in the vehicle or be detachable from the vehicle. For example, the display device 100 may be head units (H/Us), navigators, tablet personal computers (PCs), electronic picture frames or the like which are provided in the vehicle. The display device 100 may display diverse state information on the vehicle and control menus which are received from the ECU 300, or display applications which are received from the mobile device 200.

The mobile device 200 may be mobile phones, smart phones, personal digital assistants (PDAs) or the like which include a cellular communication module. The cellular communication module is connected to an external device via a base station of a cellular system through one or more antennas (not shown) using a wireless access technology according to a cellular communication protocol. The mobile device 200 transmits or receives wireless signals containing a voice call, a video call, or a message with other communicable devices having a phone number.

The ECU 300 is an embedded system to control at least one of an electrical system and a sub system of the vehicle. The ECU 300 may include an electricity and engine control module, a power train control module, a transfer control module, a brake control module, a central control module, a central timing control module, a general electronic module, a body control module, a suspension control module, etc. Accordingly, the ECU 300 receives information from diverse sensors of the vehicle and controls overall operation of the vehicle including an automatic transmitter, a drive system, a braking system, a steering system, etc.

The display device 100 may be connected to the mobile device 200 and the ECU 300 using diverse communication methods. For example, the display device 100 may be connected to the mobile device 200 using a cable such as a universal serial bus (USB), or may be connected to the mobile device 200 wirelessly using local wireless communication methods such as Wi-Fi or Bluetooth. The mobile device 200 which is connected to the display device 100 may transfer diverse data including incoming calls and messages to the display device 100. The display device 100 may store or display the transferred diverse data. In addition, if the display device 100 receives a command to transfer data to an external device, the display device 100 may transfer the data and the command to the mobile device 200 and thus the mobile device 200 may transfer the received data to the external device in accordance with the command. The display device 100 and the mobile device 200 may transmit or receive authority information to/from each other, and may encrypt and transfer a message. When transferring data, the display device 100 or the mobile device 200 which receives the data identifies the authority information and performs a corresponding operation so that malfunctioning of other devices or false data transfer may be prevented.

The display device 100 may be connected to the ECU 300. In an exemplary embodiment, the display device 100 may be connected to the ECU 300 through a controller area network (CAN). The CAN will be described later. If The ECU 300 is connected to the display device 100, the ECU 300 transfers detected vehicle state information to the display device 100 and then the display device 100 displays or store the transferred vehicle state information. In addition, the display device 100 may display a vehicle control menu, and if the display device 100 receives a vehicle control command from the user, the display device 100 may transfer the input control command to the ECU 300. For example, the user may control the vehicle, such as on and off of headlights and temperature settings of the inside of the vehicle, through the display device 100. The ECU 300 receives the control command and controls a corresponding module.

If the mobile device 200 receives a command to make a call, transfer a message, or transfer and receive data from the display device 100, the mobile device 200 is connected to an external communication device or a server so as to perform an operation corresponding to the received command.

Figure 2:
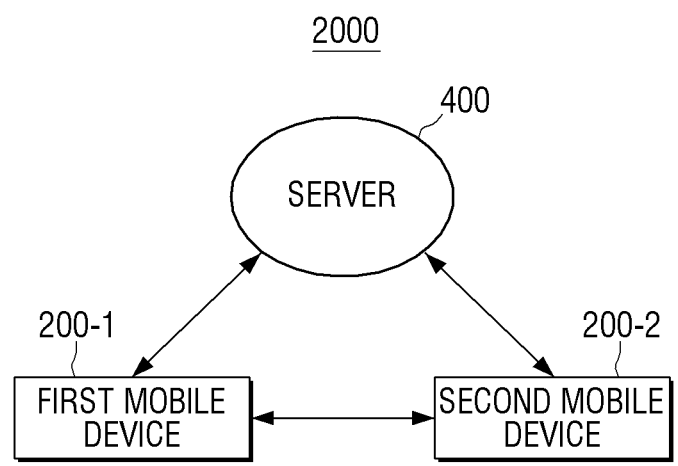
FIG. 2 is a block diagram of a system including a server and mobile devices according to an exemplary embodiment.

FIG. 2 is a block diagram of a system including a server and mobile devices according to an exemplary embodiment.

With reference to FIG. 2, a first and second mobile device 200-1 and 200-2 and a server 400 are shown.

The first and second mobile device 200-1 and 200-2 each include a cellular communication module (not shown) as described above with reference to FIG. 1. Accordingly, the first and second mobile device 200-1 and 200-2 are connected to each other using a wireless access technology according to a general cellular communication protocol. The first and second mobile device 200-1 and 200-2 perform voice call, video call, message transfer, and data transfer. The first and second mobile device 200-1 and 200-2 may communicate with the server 400.

In the system 2000 shown in FIG. 2, the type of the server 400 may vary based on its various functions. With respect to relationship with the server 400, the first and second mobile device 200-1 and 200-2 may perform the same function, and thus are referred to as the mobile device 200.

For example, if the mobile device 200 requests location information, the server 400 may be a map data server which stores map-related data. If the mobile device 200 requests advertisement information, the server 400 may be an advertisement server. If the mobile device 200 requests traffic information, the server 400 may be a traffic information server which stores real-time traffic information. The server 400 may not perform a single specific function but store diverse information. In addition, if the server 400 receives a request for information from the mobile device 200, the server 400 may search other servers or webs and transfer the requested information to the mobile device 200.

In another exemplary embodiment, the server 400 may not be a physically existing server but be a web such as internet. In addition, the server 400 may be a management server which generates a user profile corresponding to user information received from the mobile device 200 and stores information on the user. That is, the server 400 may receive a call conversation from the mobile device 200. The server 400 may store the call conversation in a corresponding user profile and extract a keyword from the call conversation. The server 400 may search for advertisement information which matches the extracted keyword from the advertisement server 400, and transfer the advertisement information to the mobile device 200.

For example, the mobile device 200 may be connected to the server 400 using a wireless local area network (LAN) such as Wi-Fi.

As described above, the mobile device 200 may be connected to other communication devices using a cellular communication method to transmit and receive voice call or data, and may be connected to the server 400 using a wireless LAN to transmit and receive data. Until now, the service providing system 1000, and the system 2000 including the server 400 and the mobile device 200 have been described. The display device 100 and the mobile device 200 in the service providing system 1000 are described below.

Figure 3:
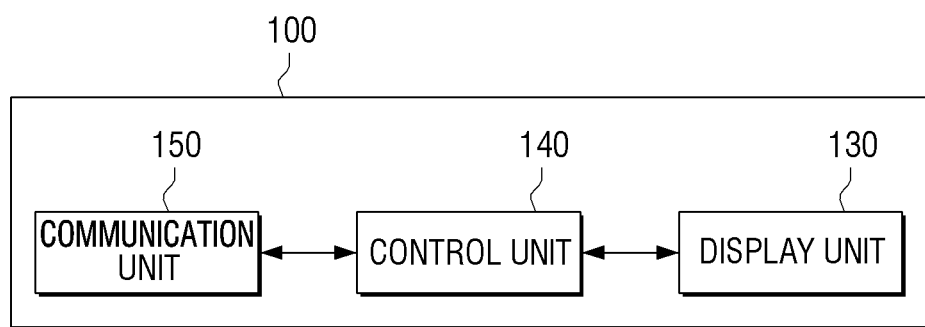
FIG. 3 is a block diagram of a display device according to an exemplary embodiment.

FIG. 3 is a block diagram of a display device according to an exemplary embodiment.

With reference to FIG. 3, the display device 100 may include a display unit 130, a control unit 140, and a communication unit 150.

The communication unit 150 communicates with the mobile device 200. Communication with the mobile device 200 may be performed using a cable or wirelessly. If the mobile device 200 performs a call connection, the communication unit 150 receives a call conversation and transfers the user's voice to the mobile device 200. The communication unit 150 transfers an extracted keyword to the mobile device 200 and receives additional information corresponding to the keyword from the mobile device 200. The keyword indicates main terms such as person's names, place names, film titles, and product names. The additional information is information related to the keyword. For example, if a keyword is a person's name, additional information may be the person's contact information, if a keyword is a place name, additional information may be place information, and if a keyword is a film title, additional information may be film advertisement information.

The display unit 130 displays the additional information corresponding to the keyword. The display unit 130 may be at least one of a liquid crystal display, a thin film transistor-liquid crystal display, an organic light emitting diode, a flexible display, and a three-dimensional display. A method for displaying the additional information corresponding to the keyword will be described later.

If the mobile device 200 makes a call, the control unit 140 acquires a keyword in a call conversation. In an exemplary embodiment, to acquire a keyword, the display device 100 receives an audio signal of an analog format including user voice, and converts the audio signal into a digital signal. The display device 100 removes noise from the digital signal and determines a keyword in the noise-removed digital signal. In another exemplary embodiment, the display device 100 generates the converted digital signal as text information and determines a keyword by analyzing the text information.

The control unit 140 searches for additional information using the acquired keyword. The control unit 140 may search a storage unit (not shown) of the display device 100. In addition, after the control unit 140 transfers a search command to the mobile device 200, the server 400, the mobile device 200, or a communication device which is connected to the mobile device 200 may be searched for the additional information.

In addition, if the displayed additional information is selected, the control unit 140 provides a service corresponding to the selected additional information. For example, if location information is selected, a navigation service for guiding a route to a destination corresponding to the location information may be provided. If contact information is selected, a call service for making a call to the contact information may be provided. If multimedia content is selected, the multimedia content may be reproduced. If advertisement information is selected, the advertisement information may be reproduced. The control unit 140 controls all the components of the display device 100 including the display unit 130 and the communication unit 150.

The display device 100 may further include a storage unit (not shown). The storage unit may store detected keywords, received additional information, phone numbers, map data, etc.

Figure 4:
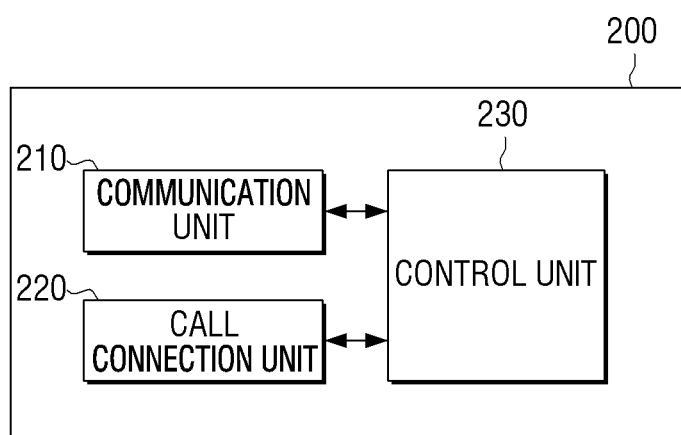
FIG. 4 is a block diagram of a mobile device according to an exemplary embodiment.

FIG. 4 is a block diagram of a mobile device according to an exemplary embodiment.

With reference to FIG. 4, the mobile device 200 may include a communication unit 210, a call connection unit 220, and a control unit 230.

The communication unit 210 communicates with the display device 100. If the mobile device 200 makes a call to another mobile device, the communication unit 210 transfers a call conversation to the display device 100. In addition, the communication unit 210 may receive a keyword from the display device 100, and transfer additional information, which is found using the keyword by a server, the mobile device 200, or the connected mobile device, to the display device 100.

The call connection unit 220 may include a cellular communication module (not shown) and thus can make a call to other mobile devices. The call connection unit 220 is shown in FIG. 4 as a separate component, but may be included in the communication unit 210.

The control unit 230 searches for additional information using a keyword. If the display device 100 does not perform a function of extracting keywords, the control unit 230 of the mobile device 200 may extract keywords. Since the method for extracting a keyword has been described above, description thereof is not repeated. The mobile device 200 may further include a storage unit (not shown). The storage unit may store detected keywords, received additional information, phone numbers, map data, etc.

The control unit 230 may control the communication unit 210 to transfer a call conversation to the server 400, to receive additional information corresponding to a keyword included in the call conversation, and to transfer the received additional information to the display device 100. In particular, the control unit 230 may control the communication unit 210 to receive advertisement information from the server 400 and to transfer the advertisement information to the display device 100.

Figure 5:
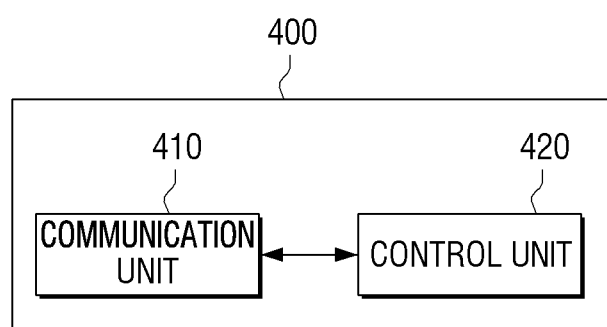
FIG. 5 is a block diagram of a server according to an exemplary embodiment.

FIG. 5 is a block diagram of a server according to an exemplary embodiment.

With reference to FIG. 5, the server 400 may include a communication unit 410 and a control unit 420. The server 400 may receive a call conversation, extract a keyword, and transfer additional information related to the keyword to the mobile device 200.

The communication unit 410 receives a call conversation and location information from the mobile device 200. The call conversation and location information may be encrypted and transferred. The server 400 may further include a storage unit (not shown) which categorizes the call conversation and the location information according to users or locations and stores them.

The control unit 420 extracts a call keyword from the call conversation and searches for advertisement information based on the call keyword and the location information. The call keyword indicates main terms in the call conversation. The call keyword is extracted by giving a priority to repeated terms or a set of terms which belong to one category. For example, in a call conversation, if movies are discussed, the term "movie" may be repeated and the terms "movie A", "movie B", "AA theater" and "BB theater" may be extracted. In this case, "movie A", "movie B", "AA theater" and "BB theater" may be extracted as the call keywords. The control unit 420 may give a priority to the extracted terms based on the number of times a term is repeated (i.e., the repeat count).

If the user is on XXX street, the control unit 420 searches for information on adjacent theaters or information on movie A using received location information on XXX street and the call keyword such as movie A. The communication unit 410 may transmit the found advertisement information to at least one of the display device 100, the mobile device 200, and an external display device which is located within a predetermined area. For example, the external display device may be a public information display (PID) which is installed on streets.

The external display device within the predetermined area may be set to an external display device within a predetermined distance, e.g. 10 m, of the mobile device 200, or may be set to an external display device which is the most adjacent to the mobile device 200.

The server 400 may be a simple search server. In this case, the server 400 may receive a keyword from the mobile device 200, search for additional information related to the keyword, and transfer the additional information to the mobile device 200. The server 400 may store data regarding the additional information as a database in the storage unit (not shown).

Until now, the display device 100, the mobile device 200, and the server 400 which constitute the system have been described. Hereinbelow, diverse exemplary embodiments regarding a method for providing a service using the display device 100 are described.

Figure 6:
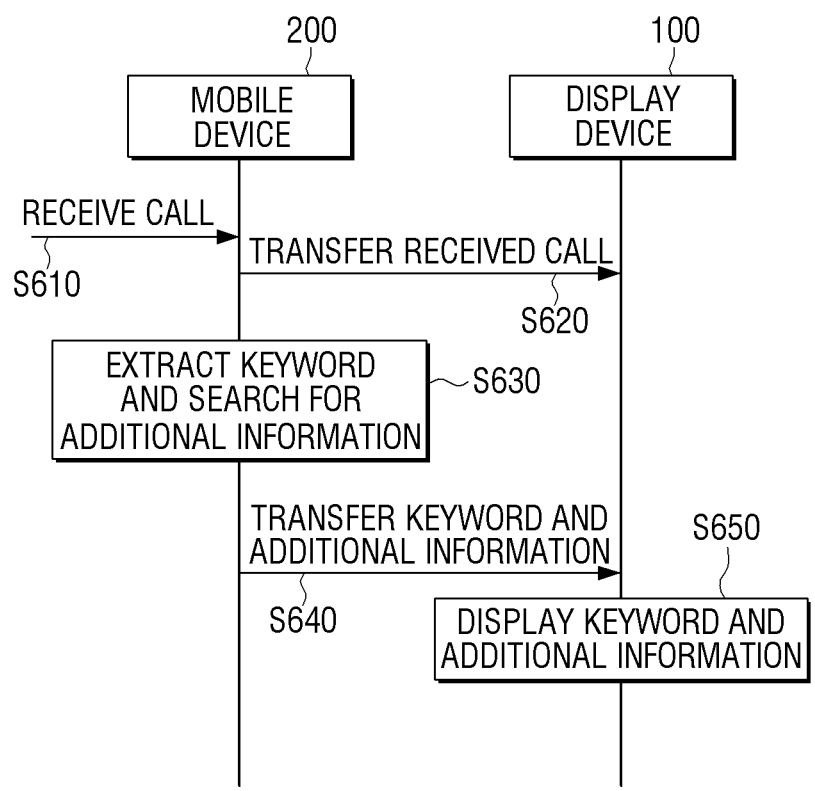
FIG. 6 is a timing chart illustrating a method for extracting a keyword while talking over the phone and displaying additional information on the display device according to the first exemplary embodiment.

FIG. 6 is a timing chart illustrating a method for extracting a keyword while talking over the phone and displaying additional information on the display device according to the first exemplary embodiment. In the first exemplary embodiment of FIG. 6, the mobile device 200 extracts a keyword from a call conversation and searches the storage unit of the mobile device 200.

With reference to FIG. 6, in operation S610, the mobile device 200 receives a call signal from another mobile device. In operation S620, the mobile device 200 transfers the received call conversation to the display device 100. The mobile device 200 may transfer the call conversation to the display device 100 by processing the call signal. In addition, the mobile device 200 may transfer the received call signal as it is to the display device 100. At this time, the display device 100 may display the same screen as one that is displayed on the mobile device 200, or may display a unique screen of the display device 100 by executing a predetermined application when a call signal is received.

In operation S630, the mobile device 200 extracts a keyword from the call conversation and searches for additional information which is linked to the keyword. The mobile device 200 receives an audio signal of analog format including the user's voice and converts the audio signal into a digital signal. The mobile device 200 may remove noise from the digital signal, determine a keyword from the digital signal of which noise is removed, and extract the keyword. In addition, the mobile device 200 may generate text information using the converted digital signal, analyze the text information, and determine a keyword.

The mobile device 200 analyzes the keyword and searches the storage of the mobile device 200. For example, the keyword may be a person's name or a place name. The additional information is information related to the keyword. For example, if a keyword is a person's name, additional information may be the person's contact information. If a keyword is a place name, additional information may be place information.

If the extracted keyword is a person's name, the mobile device 200 may search a phone number list stored in the storage unit. If the person's name is found in the list, the mobile device 200 determines that information such as a phone number and a photograph which are mapped with the person's name is additional information. The mobile device 200 may store map data and extract a place name as a keyword. At this time, if the mobile device 200 searches the map data and finds the place name in the map data, the mobile device 200 determines that information such as an address and a phone number which are mapped with the place name is additional information.

In operation S640, the mobile device 200 transfers the keyword and the found additional information to the display device 100. Searching for and transferring the additional information using the mobile device 200 may be performed in real time while talking over the phone. Alternatively, searching for the additional information using the mobile device 200 may be performed in real time while talking over the phone, and the found additional information may be temporarily stored and be transferred to the display device 100 after the call is finished. In operation S650, the display device 100 displays the keyword and the additional information. A detailed displaying method will be described later.

Figure 7:
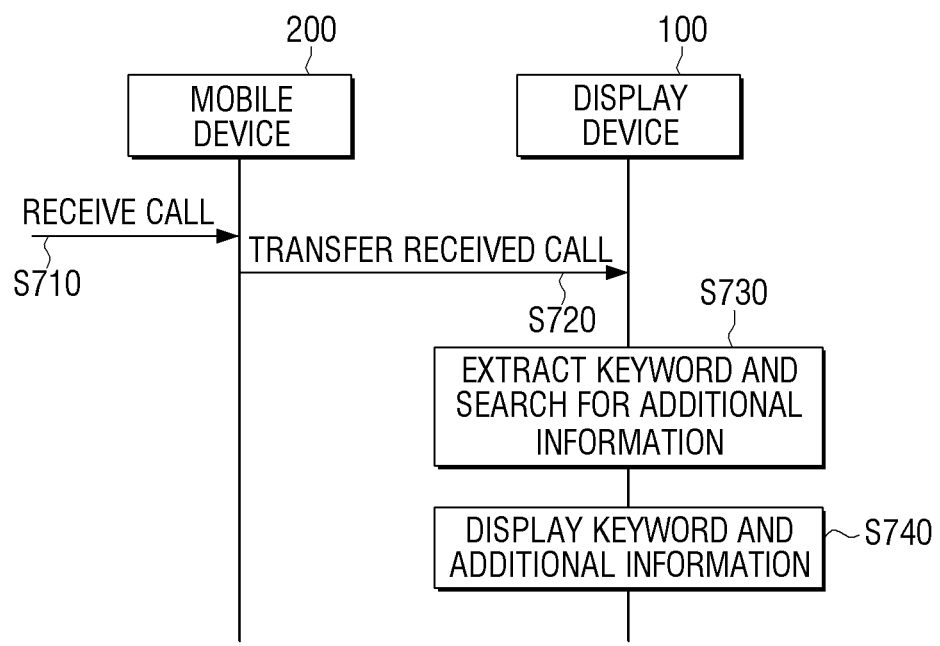
FIG. 7 is a timing chart illustrating a method for extracting a keyword while talking over the phone and displaying additional information on the display device according to the second exemplary embodiment.

FIG. 7 is a timing chart illustrating a method for extracting a keyword while talking over the phone and displaying additional information on the display device according to the second exemplary embodiment. In the second exemplary embodiment of FIG. 7, the display device 100 extracts a keyword from a call conversation and searches for additional information.

With reference to FIG. 7, in operation S710, the mobile device 200 receives a call signal from another mobile device. In operation S720, the mobile device 200 transfers received call conversation to the display device 100. If the display device 100 receives the call conversation from the mobile device 200, the display device 100 executes a predetermined application and displays a unique call screen.

In operation S730, the display device 100 extracts a keyword from the call conversation and searches for additional information related to the keyword. The process of extracting a keyword has been described above, so detailed description is not repeated. The display device 100 may search its storage unit for the additional information. If the extracted keyword is a person's name, the display device 100 searches a phone number list. If the extracted keyword is a place name and the display device 100 stores map data, the display device 100 searches the map data.

If the display device 100 does not store a phone number list or map data, the display device 100 may transfer the keyword to the mobile device 200. If the mobile device 200 receives the keyword, the mobile device 200 may search a stored phone number list or map data for additional information related to the keyword. As described above, if the keyword is a person's name, the mobile device 200 searches a phone number list. If the person's name is found in the list, the mobile device 200 determines that information such as a phone number and a photograph which are mapped with the person's name is the additional information. If the keyword is a place name, the mobile device 200 searches map data. The mobile device 200 searches for the additional information, e.g. a phone number, photo, and address, related to the keyword, and transfers the found additional information to the display device 100.

In operation S740, the display device 100 displays the keyword and the additional information.

Figure 8:
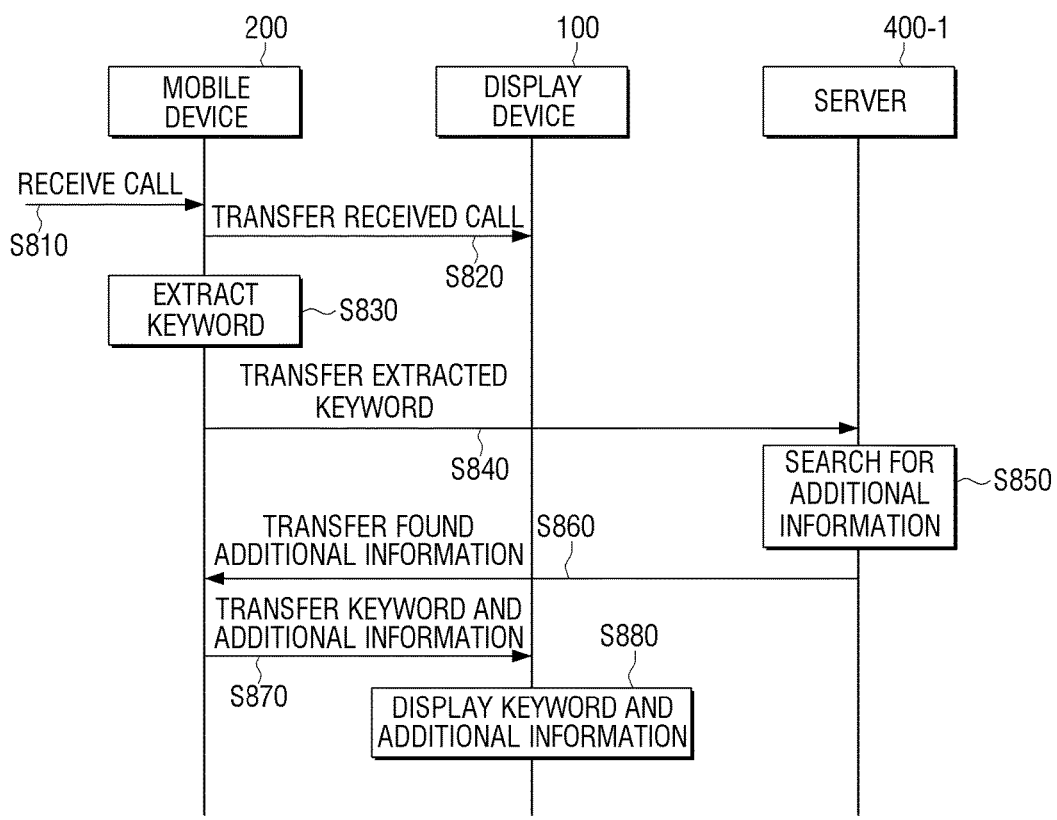
FIG. 8 is a timing chart illustrating a method for extracting a keyword while talking over the phone and displaying additional information on the display device according to the third exemplary embodiment.

FIG. 8 is a timing chart illustrating a method for extracting a keyword while talking over the phone and displaying additional information on the display device according to the third exemplary embodiment. In the third exemplary embodiment of FIG. 8, the mobile device 200 extracts a keyword from a call conversation and requests that the server 400 search for additional information. In general, the display device 100 or the mobile device 200 only stores limited data, e.g. telephone numbers. Accordingly, content information such as an advertisement, or specific place information may not be searched for by only searching the display device 100 or the mobile device 200.

With reference to FIG. 8, in operation S810, the mobile device 200 receives a call signal from another mobile device. In operation S820, the mobile device 200 transfers a received call conversation to the display device 100. In operation S830, the mobile device 200 extracts a keyword from the call conversation.

In operation S840, the mobile device 200 transfers the extracted keyword to the server 400-1. In operation S850, the server 400-1 receives the keyword and searches for additional information related to the keyword. A plurality of keywords may be extracted. For example, if the keyword is a business name, the server 400-1 may search for an address and a phone number related to the business name. If a plurality of keywords are extracted, the server 400-1 may give a priority to the keywords based on a repeat count, and additional information related to less than a predetermined number of keywords may be searched for. For example, if keywords which are given priority are "movie AA" and "BB theater", the server 400-1 searches for advertisement information related to "movie AA" or advertisement information related to "BB theater" as additional information.

In operation S860, the server 400-1 may receive a keyword from the mobile device 200 in real time and transfer found additional information to the mobile device 200 in real time. In operation S870, the mobile device 200 transfers the keyword and the received additional information to the display device 100. In operation S880, the display device 100 displays the keyword and the additional information.

Figure 9:
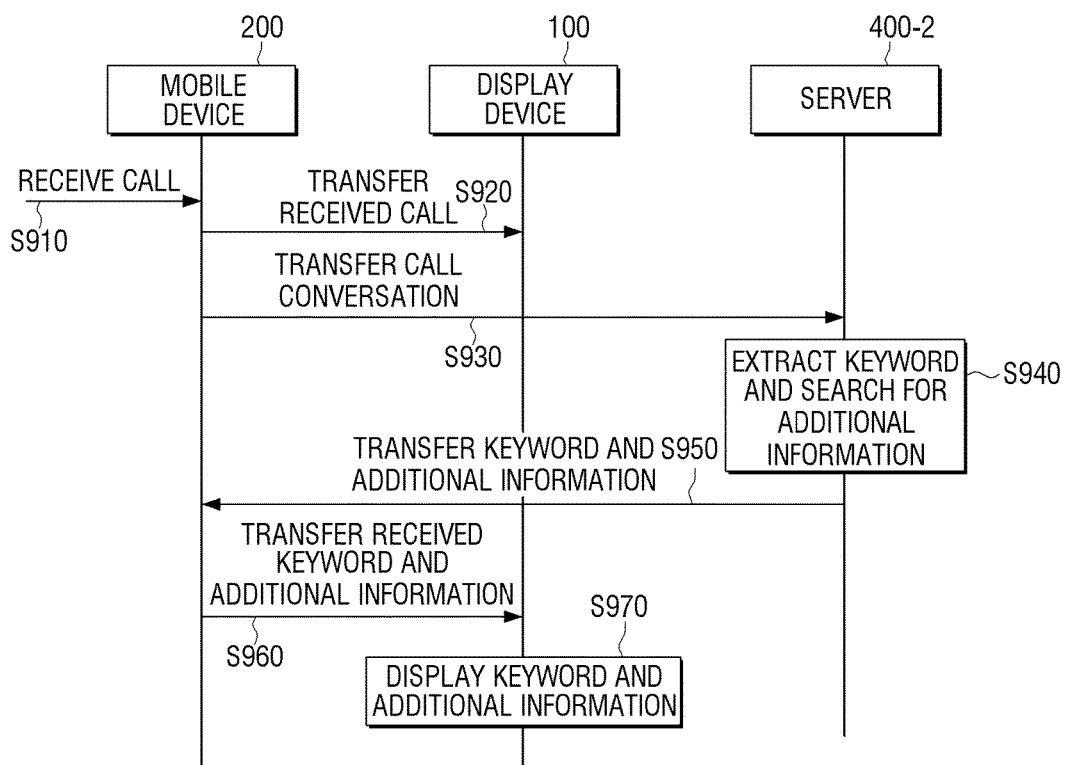
FIG. 9 is a timing chart illustrating a method for extracting a keyword while talking over the phone and displaying additional information on the display device according to the fourth exemplary embodiment.

FIG. 9 is a timing chart illustrating a method for extracting a keyword while talking over the phone and displaying additional information on the display device according to the fourth exemplary embodiment. In the fourth exemplary embodiment of FIG. 9, the mobile device 200 transfers a call conversation to a server 400-2, and the server 400-2 extracts a keyword from the call conversation and searches for additional information.

With reference to FIG. 9, in operation S910, the mobile device 200 receives a call signal from another mobile device. In operation S920, the mobile device 200 transfers a received call conversation to the display device 100.

In operation S930, the mobile device 200 transfers the call conversation to the server 400-2. At this time, the server 400-2 may not be a general search server but be a management server to generate and manage a profile according to users. The server 400-2 may generate a user profile for each user and store a received call conversation in a corresponding user profile. If there is a previously generated user profile, a received call conversation may be stored in a corresponding previously generated user profile. When the mobile device 200 transfers the call conversation to the server 400-2, a unique identifier (e.g. an identification or a phone number) of the mobile device 200 may be transferred together. In addition, the call conversation may be encrypted and transmitted for security.

In operation S940, the server 400-2 extracts a keyword from the call conversation and searches for additional information related to the keyword. Extracting a keyword from the call conversation and searching for additional information may be performed in a similar manner as described above. In operation S950, the server 400-2 may transfer the keyword and the additional information to the mobile device 200, or may only transfer the additional information. In operation S960, the mobile device transfers the keyword and the additional information to the display device 100. In operation S970, the display device 100 displays the keyword and the additional information.

Figure 10:
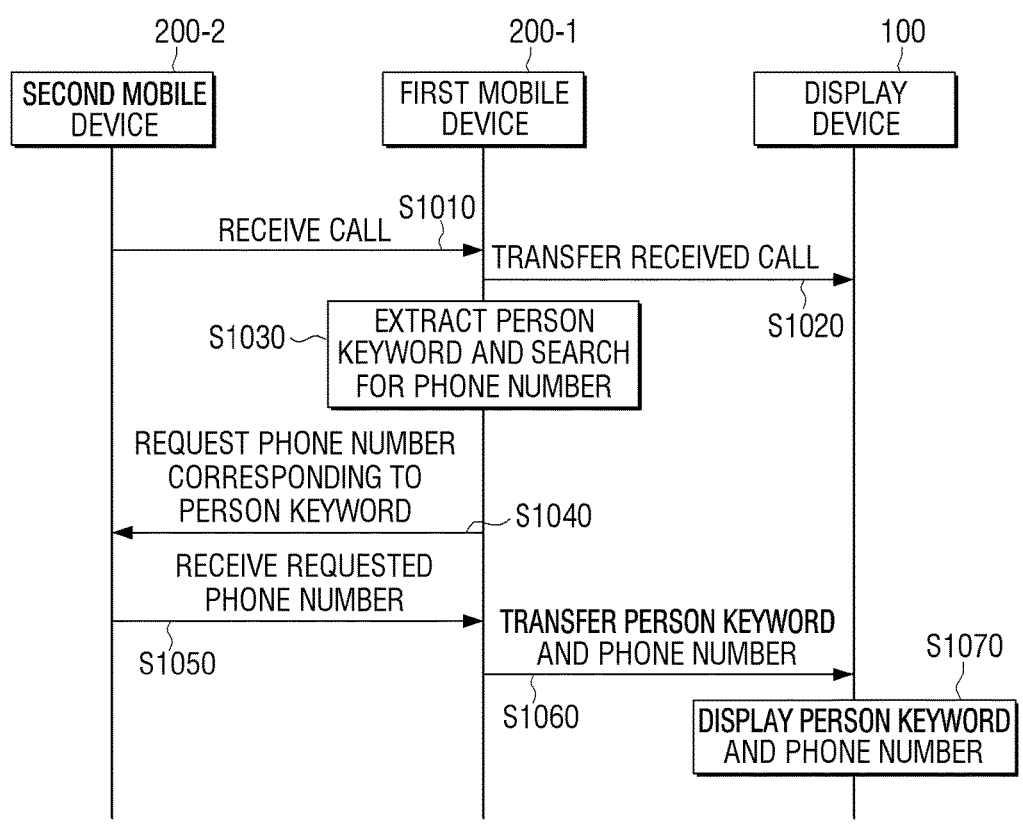
FIG. 10 is a timing chart illustrating a method for extracting a keyword while talking over the phone and displaying additional information on the display device according to the fifth exemplary embodiment.

FIG. 10 is a timing chart illustrating a method for extracting a keyword while talking over the phone and displaying additional information on the display device according to the fifth exemplary embodiment. In the fifth exemplary embodiment of FIG. 10, the first mobile device 200-1 requests a search from the second mobile device 200-2 which the mobile device 200-1 is talking over the phone with. For example, if "person AAA" is mentioned in the call conversation, contact information of "person AAA" may not be stored in the first mobile device 200-1 but may be stored in the second mobile device 200-2. In this case, the first mobile device 200-1 may receive the contact information of AAA from the second mobile device 200-2.

With reference to FIG. 10, in operation S1010, the first mobile device 200-1 receives a call signal from the second mobile device 200-2. In operation S1020, the first mobile device 200-1 transfers a call conversation to the display device 100.

In operation S1030, the first mobile device 200-1 extracts a keyword, e.g. a person's name, and searches a phone number list stored in its storage unit. If the first mobile device 200-1 does not search for a phone number corresponding to the keyword, the first mobile device 200-1 requests the second mobile device 200-2 to search for additional information related to the keyword in operation S1040. That is, the first mobile device 200-1 requests the second mobile device 200-2 to search for contact information corresponding to the extracted person's name. In operation S1050, the second mobile device 200-2 searches for the additional information at the request of the first mobile device 200-1 and transfers the additional information to the first mobile device 200-1. If the second mobile device 200-2 does not also find the additional information, the second mobile device 200-2 may transfer a signal indicating that the requested additional information does not exist, to the first mobile device 200-1.

In operation S1060, the first mobile device 200-1 transfers the keyword and the received additional information to the display device 100. In operation S1070, the display device 100 displays the keyword and the additional information.

With reference to FIGS. 6 to 10, diverse methods for extracting a keyword and searching for additional information have been described. The display device 100 may display the keyword and the additional information using the aforementioned methods. From among the aforementioned methods, one or a combination of two or more methods may be used. If searching for a keyword and additional information may be performed by a plurality of devices, it may be possible to designate only a single device to perform the search according to a priority. In addition, it may be possible that a predetermined device or devices searches for predetermined additional information.

Figure 11:
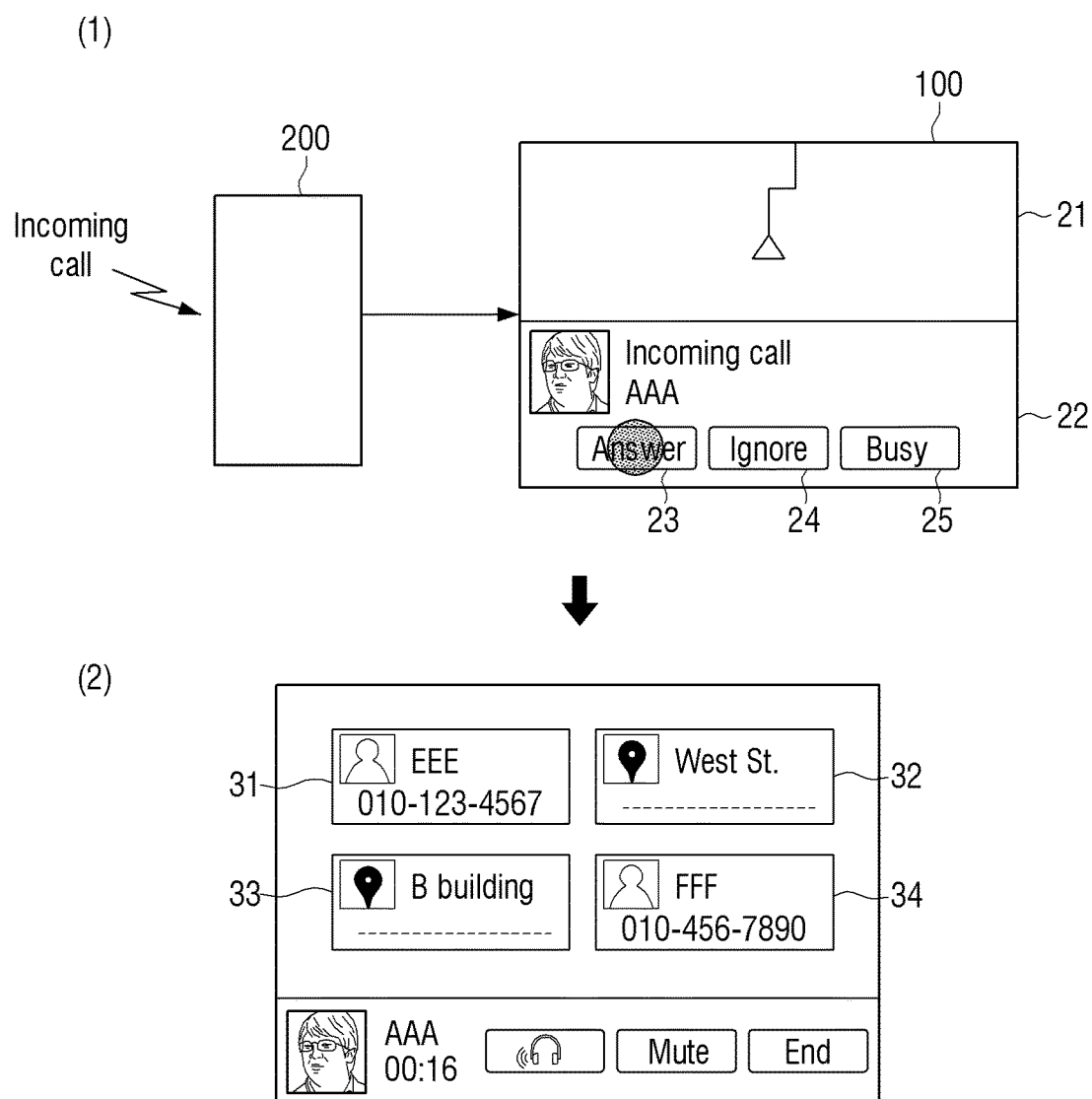
FIG. 11 illustrates display of additional information according to an exemplary embodiment.

FIG. 11 illustrates display of additional information according to an exemplary embodiment.

With reference to (1) of FIG. 11, the display device 100 is connected to the mobile device 200. The mobile device 200 receives a call signal from another mobile device. The mobile device 200 transfers a call conversation to the display device 100. The display device 100 is providing a navigation service. The display device 100 may be reproducing content or be providing other operations.

If the display device 100 receives the call signal from the mobile device 200, the display device 100 may divide the display unit 130 into two portions. An upper portion 21 displays the navigation service, and a lower portion 22 displays content related to the received call signal. That is, the lower portion 22 may display notification of reception of the call and the caller's name, photograph, and phone number. Information on the caller may have been stored in the display device 100 or may be transferred together with the call signal from the mobile device 200. The lower portion 22 may further display an "answer" button 23, an "ignore" button 24, and a "busy" button 25. If the "ignore" button 24 is selected, the call is ignored. If the "busy" button 25 is selected, a predetermined message is transferred to the caller. If the "answer" button is selected, the call is connected.

With reference to (2) of FIG. 11, if the call is connected, the display device 100 displays keywords extracted from the call conversation, and additional information related to the extracted keywords. Keywords may be extracted in real time during the call. As described above, keywords may be extracted by at least one of the display device 100, the mobile device 200, and the server 400. If a person's name, EEE, is extracted from the call conversation, additional information 31 of EEE including EEE's photograph and phone number may be displayed. If B building is extracted from the call conversation, additional information 33 of B building including an address of B building may be displayed. The additional information may be displayed in real time during the call, or all the additional information may be displayed at the same time after the call is finished.

The display device 100 may display the keyword and the additional information in a figure of a predetermined form (e.g. a triangle, quadrangle, pentagon, hexagon, circle, etc.). For example, if a keyword is a person's name, the person's name and phone number may be displayed in a quadrangle. In addition, the person's photograph may be further displayed. If a keyword is a place name, an icon indicating a place name and the place name may be displayed in a quadrangle. In addition, the place's address or phone number may be further displayed. As shown in (2) of FIG. 11, the display device 100 displays additional information only when the keyword is a person's name or a place name. In addition, additional information, such as advertisement information and multimedia content, as well as additional information related to the person's name and the place name may be further displayed. Furthermore, types of additional information to display may be set by the user. The order of arranging additional information in the display device 100 may be the order of searching for the additional information or the alphabetical order of the keywords, or may be arranged according to the type of the keyword.

If the displayed additional information is selected, the display device 100 performs a corresponding service.

Figure 12:
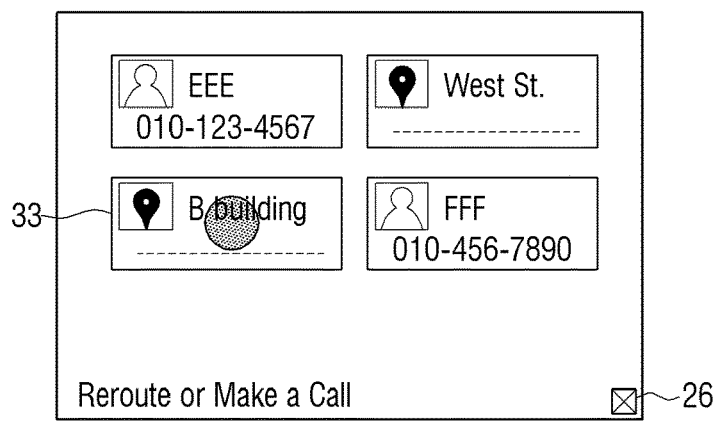
FIG. 12 illustrates a service of changing a destination according to an exemplary embodiment.
Figure 12:
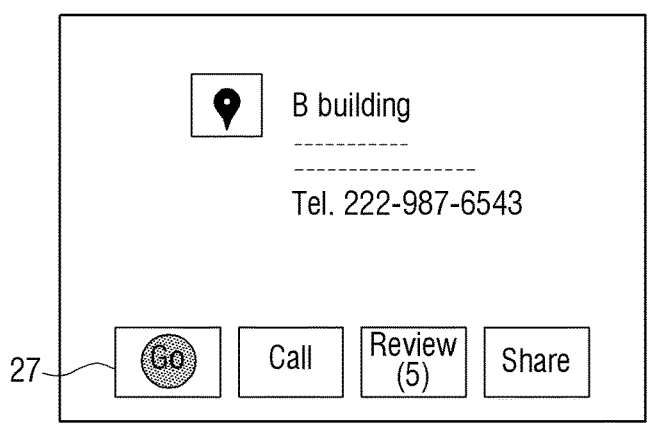
Figure 12:
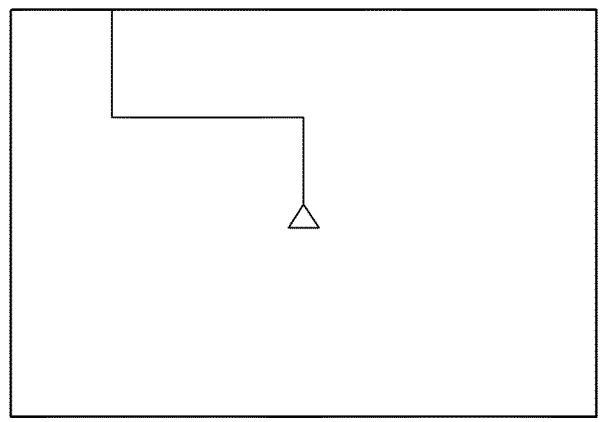

FIG. 12 illustrates a service of changing a destination according to an exemplary embodiment.

With reference to (1) of FIG. 12, the display device 100 displays additional information after the call is finished. As described with reference to FIG. 11, the display device 100 displays additional information related to keywords extracted from a call conversation. If the user selects a "close" button 26, the display device 100 closes an additional information display window and returns to a previous service screen. The user selects an additional information menu 33 of B building.

With reference to (2) of FIG. 12, the display device 100 displays detailed information of B building. The detailed information of B building may include an address and a phone number and further include a destination setting button, a call button, a button for showing reviews of B building, and a share button. The user selects the destination setting button 27.

With reference to (3) of FIG. 12, the display device 100 displays a destination changed by the user selecting the destination setting button 27. That is, the display device 100 provides the navigation service of which destination has changed to B building. In this manner, the destination can easily change so that it may be possible to change the destination fast and safely while driving.

Figure 13:
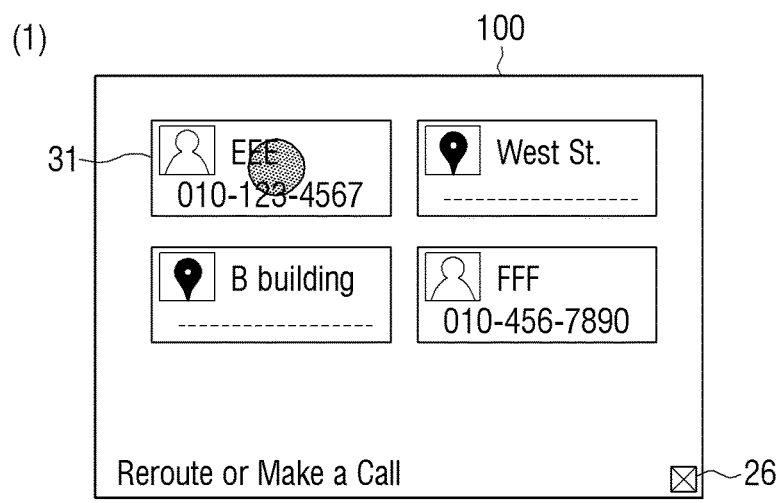
FIG. 13 illustrates a service of making a call to a third party according to an exemplary embodiment.
Figure 13:
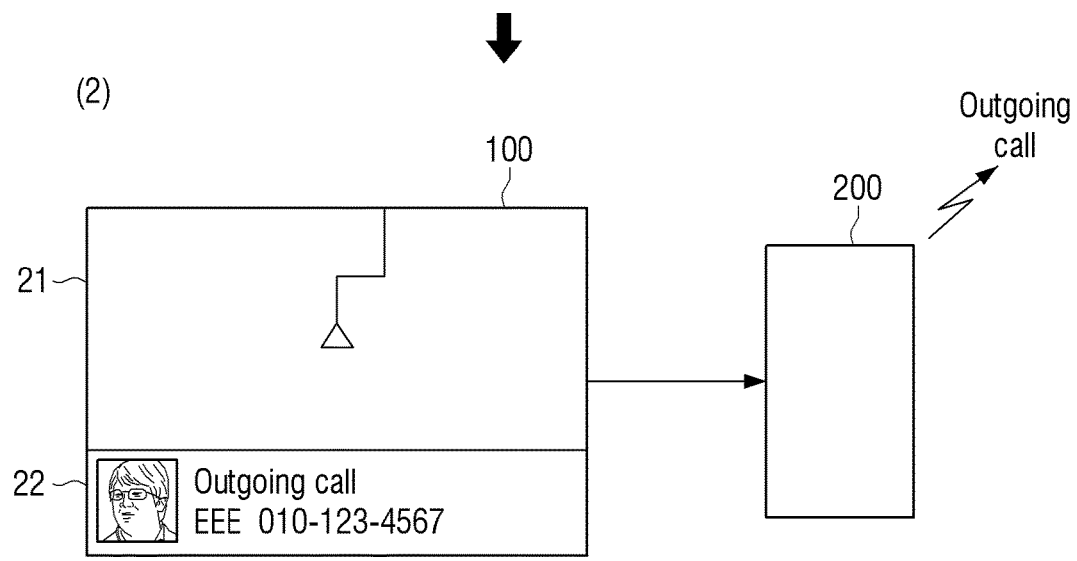

FIG. 13 illustrates a service of making a call to a third party according to an exemplary embodiment.

With reference to (1) of FIG. 13, the display device 100 displays additional information after the call is finished. As described with reference to FIG. 11, the display device 100 displays additional information related to keywords extracted from a call conversation. If the user selects a "close" button 26, the display device 100 closes an additional information display window and returns to a previous service screen. The user selects an additional information menu 31 of person EEE.

With reference to (2) of FIG. 13, the display device 100 makes a call to a phone number of EEE in response to the user's selection. That is, if the display device 100 requests the connected mobile device 200 to make a call to EEE, the mobile device 200 tries to make a call to EEE. At this time, the display device 100 may divide the display unit 130 into two portions. An upper portion 21 may display the navigation service, and a lower portion 22 may display information on the recipient EEE.

FIGS. 12 and 13 illustrate the exemplary embodiments of when additional information of a person's name and a place name are selected. However, additional information may be advertisement information. In this case, the display device 100 may display advertisement additional information as a menu, and if the user selects the advertisement additional information menu, the display device 100 may display the advertisement information.

The display device 100 performs call connection through the mobile device 200. However, the display device 100 may perform call connection without the mobile device 200 by including a cellular communication module.

Figure 14:
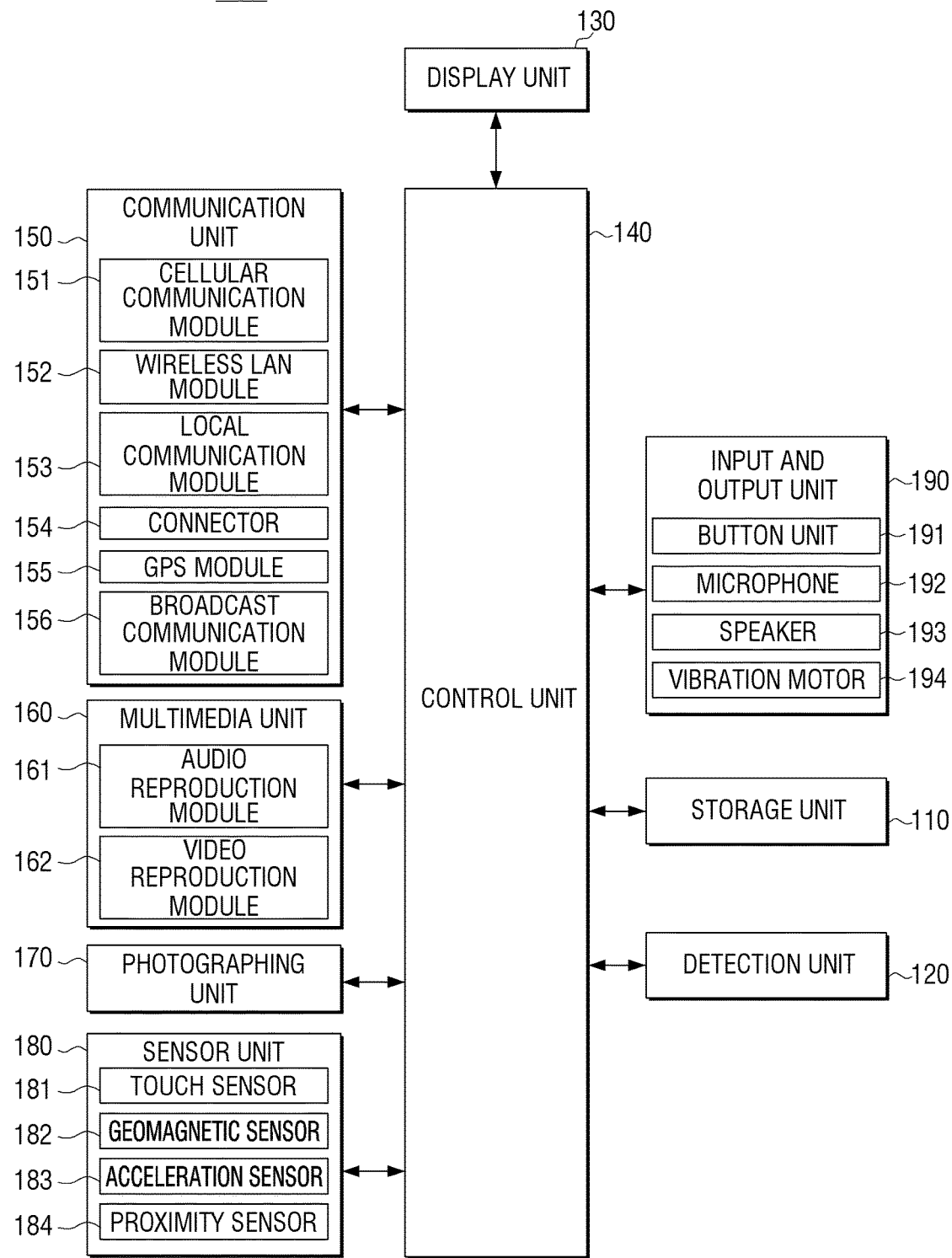
FIG. 14 is a block diagram of a configuration of a display device according to another exemplary embodiment.

FIG. 14 is a block diagram of a configuration of a display device according to another exemplary embodiment.

With reference to FIG. 14, the display device 100A may include a storage unit 110, a detection unit 120, a display unit 130, a control unit 140, a communication unit 150, a multimedia unit 160, a photographing unit 170, a sensor unit 180, and an input and output unit 190.

The storage unit 110 stores diverse types of multimedia data processed by the control unit 140, content data, and data received from an external source.

The storage unit 110 also stores control programs to control the display device 100A or the control unit 140, and applications. Hereinafter, the term "storage unit" may include a read-only memory (ROM), a random-access memory (RAM), and a memory card (e.g. a secure digital (SD) card and a memory stick) which is attachable to or detachable from the display device 100A. In addition, the storage unit may include a non-volatile memory, a volatile memory, a hard disk drive (HDD), and a solid state drive (SSD).

The storage unit 110 stores a plurality of templates which are set differently according to the type of message. In addition, if a call connection is performed in the display device 100A, the storage unit 110 may store a call conversation to transmit to the server 400.

The detection unit 120 detects a plurality of different pieces of state information. The detection unit 120 may receive diverse information from a global positioning system (GPS) module 155, the ECU 300, or the server 400, and detect state information.

The display unit 130 displays multimedia content, images, video, text, etc according to control of the control unit 140. The display unit 130 may be implemented in a general display panel which does not have a touch input function, or a touch display panel which recognizes the user's manipulation using a proximity sensor or a touch sensor. If the display unit 130 is a touch display panel, the display unit 130 may receive at least one touch gesture through the user's body (e.g. fingers including a thumb) or a detectable input means (e.g. a stylus pen).

Such a user interface may include a predetermined touch area, a soft key, and a soft menu. The display unit 130 may transfer an electronic signal corresponding to at least one touch gesture input through the user interface to the display unit 130 through a liquid crystal display (LCD) controller (not shown). In addition, the display unit 130 may detect continuous movement of a touch, and transfer an electronic signal corresponding to continuous or discontinuous movement of the touch to the LCD controller.

The display unit 130 may be implemented in a resistive way, capacitive way, infrared way, or acoustic wave way.

The display unit 130 converts a detection signal regarding the user's gesture detected by the touch sensor into a digital signal (e.g. X and Y coordinates), and transfers the digital signal to the control unit 140. The control unit 140 performs a control operation corresponding to the user's gesture input through the display unit 130 using the received digital signal. For example, the control unit 140 may select a soft key displayed on the display unit 130 in response to the user's gesture or execute an application corresponding to the soft key.

The user's gesture is not limited to direct contact between the display unit 130 and the user's body or the touchable input means, but includes methods by non-contact. Sensitivity of the user's gesture which can be detected by the display unit 130 may vary according to performance or structure of the display device 100A.

The control unit 140 includes a central processing unit (CPU), a ROM which stores a control program to control the display device 100A, and RAM which remembers a signal or data input from outside of the display device 100A and which is used as a memory area for jobs performed by the display device 100A. The CPU may include at least one of a single core processor, a dual core processor, a triple core processor, and a quad core processor. The CPU, the ROM, and the RAM are connected to one another through a local bus.

The control unit 140 controls the storage unit 110, the detection unit 120, the display unit 130, the communication unit 150, the multimedia unit 160, the photographing unit 170, and the sensor unit 180.

The communication unit 150 may include a cellular communication module 151, a wireless LAN module 152, a local communication module 153, a connector 154, a global positioning system (GPS) module 155, and a broadcast communication module 156.

The cellular communication module 151 connects the display device 100A to an external device (in particular, a base station of a cellular system) through one or more antenna (not shown) using wireless access technology according to a cellular communication protocol in accordance with control of the control unit 140.

In addition, the cellular communication module 151 transmits or receives a wireless signal containing voice calls, video calls, short messaging service (SMS) messages, or multimedia messaging service (MMS) messages to or from a communicable device, such as a mobile phone, a smart phone, a tablet PC or other devices, which has a phone number to be input to the display device 100A.

The wireless LAN module 152 may access the internet at a place in which a wireless access point (AP, not shown) is installed, according to control of the control unit 140. The wireless LAN module 152 supports wireless LAN standards (IEEE802.11x) of the Institute of Electrical and Electronics Engineers (IEEE).

The local communication module 153 performs wireless local communications between the display device 100A and an external device according to control of the control unit 140. The local communication methods may include Bluetooth, infrared data association (IrDA) communication, NFC, etc.

The connector 154 provides an interface, such as USB 2.0, USB 3.0, HDMI, IEEE 1394, etc, between the display device 100A and diverse devices. The connector 154 may be used as an interface which links the display device 100A with an external device or a power source. According to control of the control unit 140, the connector 154 may transmit data stored in the storage unit 110 to an external device or receive data from an external device through a cable which is connected to the connector 154. Using a cable, the connector 154 may receive power from a power source or charge its battery (not shown).

The GPS module 155 receives a radio wave from a plurality of earth orbiting GPS satellites (not shown), and measures location of the display device 100A using time of arrival from the GPS satellites to the display device 100A and GPS parameters.

The broadcast communication module 156 receives a broadcast signal (e.g. a television (TV) broadcast signal, a radio broadcast signal, or a data broadcast signal) and additional broadcast information (e.g. an electronic program guide (EPG) or an electronic service guide (ESG)) from a broadcast station through a broadcast communication antenna (not shown) according to control of the control unit 140.

The multimedia unit 160 may include an audio reproduction module 161 and a video reproduction module 162. The audio reproduction module 161 reproduces stored or received digital audio files (e.g. files having file extensions such as "mp3", "wma", "ogg", and "wav") according to control of the control unit 140. The video reproduction module 162 supports diverse forms of codec so as to reproduce digital video files. That is, the video reproduction module 162 reproduces a video file using a pre-stored codec which is suitable for a codec format of the video file to reproduce. The audio reproduction module 161 and the video reproduction module 162 of the multimedia unit 160 may be included in the control unit 140.

The photographing unit 170 photographs a still image or a moving image according to control of the control unit 140. The photographing unit 170 may include a plurality of cameras. The photographing unit 170 may include a supplementary light source (e.g. a flash (not shown)).

The photographing unit 170 transfers a photographed image to the control unit 140. The control unit 140 analyzes an image, detects the user's movement or shape, and performs a control operation corresponding to the detected movement or shape. For example, the user's movement indicates the movement of the user's hand which is detected through the photographing unit 170. The user's shape indicates the user's facial shape which is detected through the photographing unit 170.

In another exemplary embodiment, the display device 100A may detect the user's movement using a device such as an infrared detector, and execute or control an application in response to the user's movement.

Furthermore, the photographing unit 170 may be provided separately from the display device 100A. For example, the display device 100A may be provided inside a vehicle, and the photographing unit 170 may be provided outside the vehicle (e.g. a front side or back side of the vehicle). The display device 100A may be connected to the photographing unit 170 through a cable or wirelessly so that the display device 100A can display an image of the front side or back side of the vehicle photographed by the photographing unit 170.

The sensor unit 180 may include at least one of a touch sensor 181, a geomagnetic sensor 182, an acceleration sensor 183, and a proximity sensor 184.

The touch sensor 181 senses the user's touch on the display unit 130. Methods of sensing the user's touch using the touch sensor 181 include a capacitive method and a piezoelectric method. The touch sensor 181 according to an exemplary embodiment of the present invention may be implemented in the two methods. The touch sensor 181 may constitute the display unit 130 together with a display panel.

The touch sensor 181 is a sensor capable of inputting an indication on the display screen by pressing the touch screen using a body such as a finger or a detectable input means. The touch sensor 181 uses capacitance change, resistance change, or light change.

The geomagnetic sensor 182 senses azimuth by detecting terrestrial magnetism so that direction of the display device 100A can be recognized. The acceleration sensor 183 processes an output signal and measures dynamic force, such as acceleration, vibration, and impact of an object, thereby sensing change in moving speed of the display device 100A or strength of force. The proximity sensor 184 senses whether or not the display device 100A approaches an object.

Although not shown in FIG. 14, the sensor unit 180 may further include at least one of a gravity sensor for sensing in which direction gravity acts, a gyro sensor for recognizing a total of 6 axes by rotating an existing acceleration sensor, an orientation sensor for automatically sensing horizontal and vertical frames of content such as an image and automatically rotating and arranging the content, an illumination sensor for sensing intensity of illumination around the display device 100A, an altitude measuring sensor for measuring atmospheric pressure, an RGB sensor for sensing color of an object, a distance measuring sensor for measuring a distance using ultrasonic waves or infrared light, and a hall sensor for sensing change in the voltage according to strength of magnetic field.

Each sensor of the sensor unit 180 detects its state, generates a signal corresponding to the detected state, and transfer the signal to the control unit 140. Each sensor of the sensor unit 180 may be added or deleted according to the performance of the display device 100A.

The input and output unit 190 may include a button unit 191, a microphone 192, a speaker 193, and a vibration motor 194.

At least one button unit 191 may be provided on a front, side, or back of the body of the display device 100A in a push type or a touch type, and may include at least one of a power/lock button, a volume control button, a menu button, a home button, a back button, and a search button.

The microphone 192 receives voice or sound and generates an electrical signal according to control of the control unit 140.

The speaker 193 may output sounds corresponding to diverse signals (e.g. wireless signals, broadcast signals, digital audio files, digital video files, or photographing) of the cellular communication module 151, the wireless LAN module 152, the local communication module 153, the multimedia unit 154, or the photographing unit 170 to the outside of the display device 100A according to control of the control unit 140.

The speaker 193 may output sounds (e.g. button manipulation sounds or ring back tone corresponding to calling) corresponding to functions of the display device 100A. One or more speakers 193 may be provided on appropriate locations of the body of the display device 100A. For example, the speaker 193 may include an internal speaker module which is provided on a location suitable for approaching the user's ears who is on the phone, and an external speaker module which has a large output suitable for reproducing audio and video files or showing a broadcast and which is provided on an appropriate location of the body of the display device 100A.

The vibration motor 194 converts an electrical signal into a mechanical vibration according to control of the control unit 140. For example, if the display device 100A in vibration mode receives a call from another device (not shown), the vibration motor 194 operates. One or more vibration motors 194 may be provided in the body of the display device 100A. The vibration motor 194 may operate in response to the user's touch gesture or continuous movement of touch which is detected on the display unit 130.

A power unit (not shown) supplies power to the display device 100A. The power unit may be implemented in a rechargeable battery and may further include a voltage converter which converts external power supply and supplied converted power to the rechargeable battery.

The power unit may supply power to the display device 100A in diverse modes, such as maximum performance mode, general mode, power saving mode, and standby mode, according to power management control of the control unit 140.

The display device 100A may transfer a call conversation and location information of the display device 100A to the server 400 and receive diverse information related to the call conversation and the location information from the server 400. The display device 100A does not always include all of the aforementioned components but may include some of them according to an exemplary embodiment.

Figure 15:
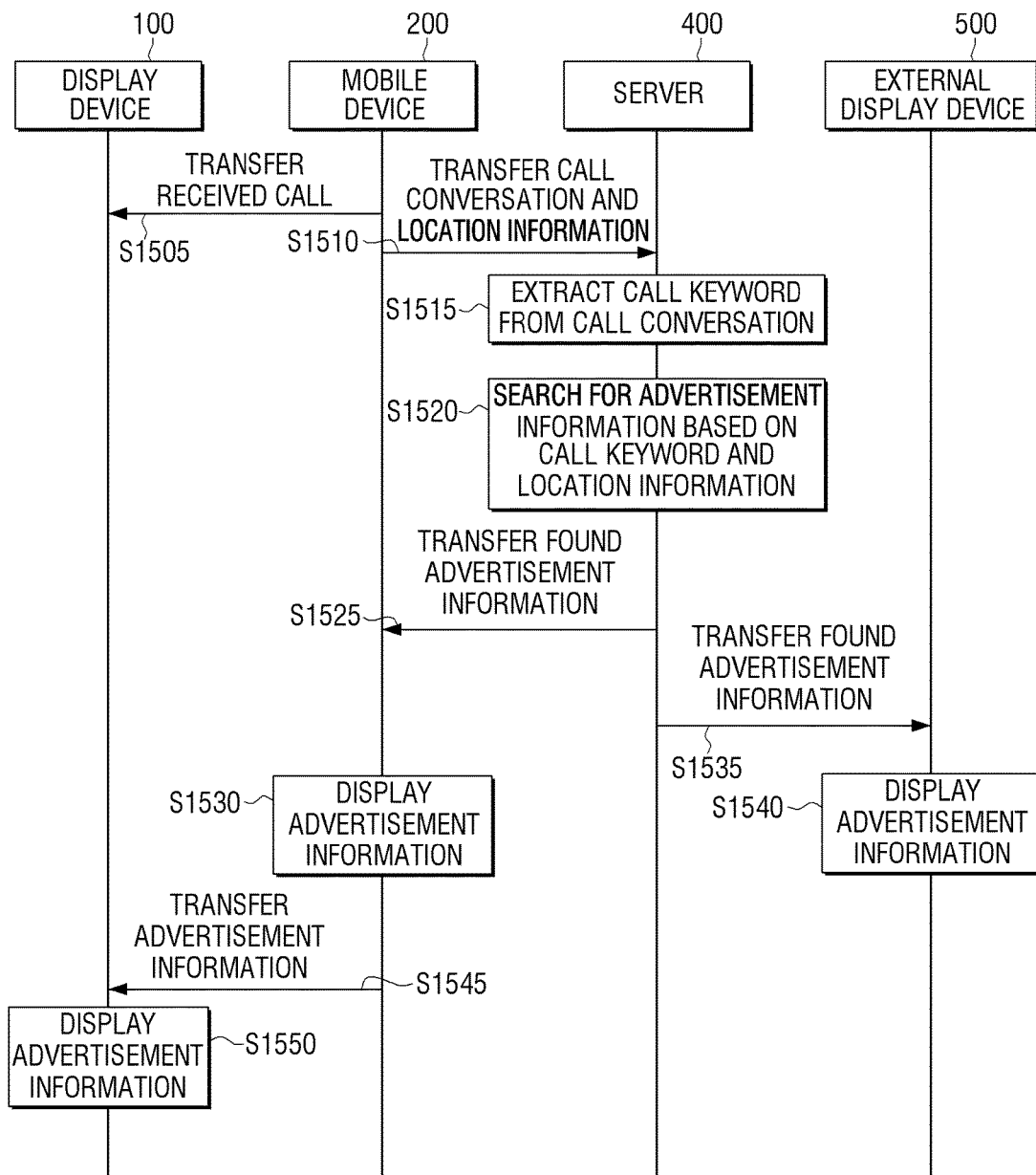
FIG. 15 is a timing chart illustrating a method for providing an advertisement service according to an exemplary embodiment.

FIG. 15 is a timing chart illustrating a method for providing an advertisement service according to an exemplary embodiment.

With reference to FIG. 15, the mobile device 200 receives a call signal from another mobile device. In operation S1505, the mobile device 200 transfers a call conversation to the display device 100. In operation S1510, the mobile device 200 transfers the call conversation and location information to the server 400. The mobile device 200 may receive the location information through a GPS module or from the display device 100. The call conversation and the location information may be encrypted and be transmitted to the server 400.

In operation S1515, the server 400 extracts a call keyword from the call conversation. The call keyword is main terms or repeated terms in the call conversation. In operation S1520, the server 400 searches for advertisement information based on the extracted call keyword and the received location information. The call keyword may be given a priority. Only call keywords of up to a predetermined priority may be used for a search.

In operation S1525, the server 400 may transfer the found advertisement information to the mobile device 200. In operation S1530, the mobile device 200 may display the received advertisement information. Alternatively, in operation S1535, the server 400 may transfer the found advertisement information to the mobile device 200 and an external display device 500 which exists within a predetermined area. In operation S1540, the external display device 500 may display the received advertisement information. The server 400 may transfer the found advertisement information to one or both of the mobile device 200 and the external display device 500.

In operation S1545, the mobile device 200 may transfer the advertisement information to the display device 100. The mobile device 200 and the display device 100 may be connected to each other through a cable or wirelessly (e.g. using Bluetooth or WiFi). In operation S1550, the display device 100 displays the advertisement information.

In FIG. 15, the advertisement information is used as an example of additional information. However, advertisement information is merely an exemplary embodiment. Multimedia content, movie information, sports highlight information, etc may be used as additional information. In addition, in FIG. 15, the single server 400 receives the location information and the call conversation, extracts the call keyword, and searches for the advertisement information. However, it may be possible that if the server 400 extracts a call keyword and transfers the extracted call keyword and the location information to another server, another server searches for the advertisement information.

Figure 16:
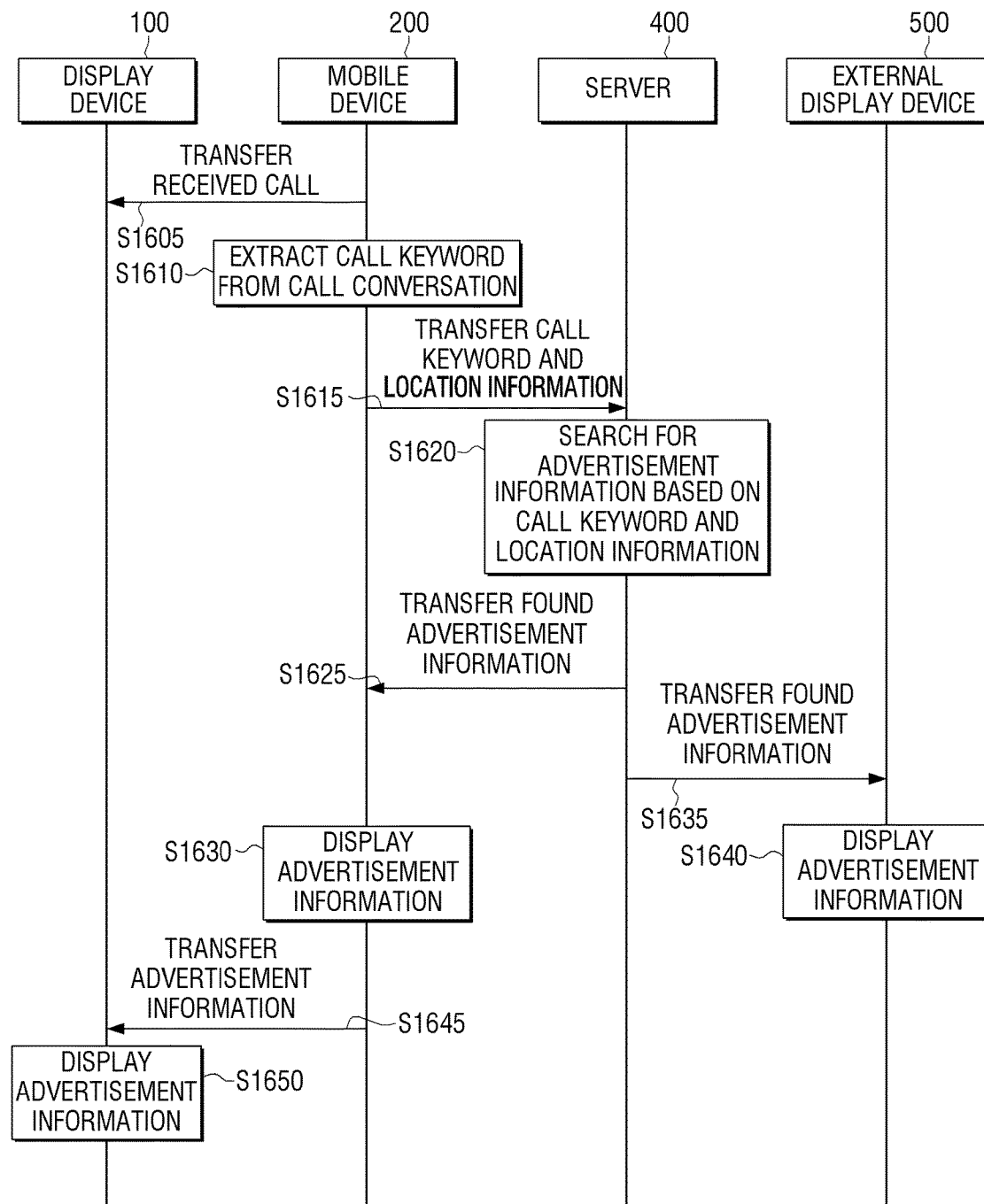
FIG. 16 is a timing chart illustrating a method for providing an advertisement service according to another exemplary embodiment.

FIG. 16 is a timing chart illustrating a method for providing an advertisement service according to another exemplary embodiment. In the exemplary embodiment of FIG. 16, the mobile device 200 extracts a keyword.

With reference to FIG. 16, the mobile device 200 receives a call signal from another mobile device. In operation S1605, the mobile device 200 transfers a call conversation to the display device 100. In operation S1610, the mobile device 200 extracts a keyword from the call conversation. Detailed process is the same as that of FIG. 15. However, the keyword is extracted by the mobile device 200. When the mobile device 200 extracts a keyword, the user may set the mobile device 200 to extract specific types of keywords. For example, only keywords related to a person's name and place name may be set to be extracted, or only advertisement information may be set to be extracted. Or, all types of keywords, not specific types of keywords, may be set to be extracted.

In operation S1615, the mobile device 200 transfers the extracted keyword and location information to the server 400. The mobile device 200 may receive the location information through a GPS module or from the display device 100.

In operation S1620, the server 400 searches for advertisement information based on the extracted call keyword and the received location information. At this time, the server 400 may be a search server which simply performs search. In operation S1625, the server 400 may transfer the found advertisement information to the mobile device 200. In operation S1630, the mobile device 200 may display the received advertisement information. Alternatively, in operation S1635, the server 400 may transfer the found advertisement information to the mobile device 200 and an external display device 500 which exists within a predetermined area. In operation S1640, the external display device 500 may display the received advertisement information. The server 400 may transfer the found advertisement information to one or both of the mobile device 200 and the external display device 500.

In operation S1645, the mobile device 200 may transfer the advertisement information to the display device 100. The mobile device 200 and the display device 100 may be connected to each other through a cable or wirelessly (e.g. using Bluetooth or WiFi). In operation S1650, the display device 100 displays the advertisement information.

Figure 17:
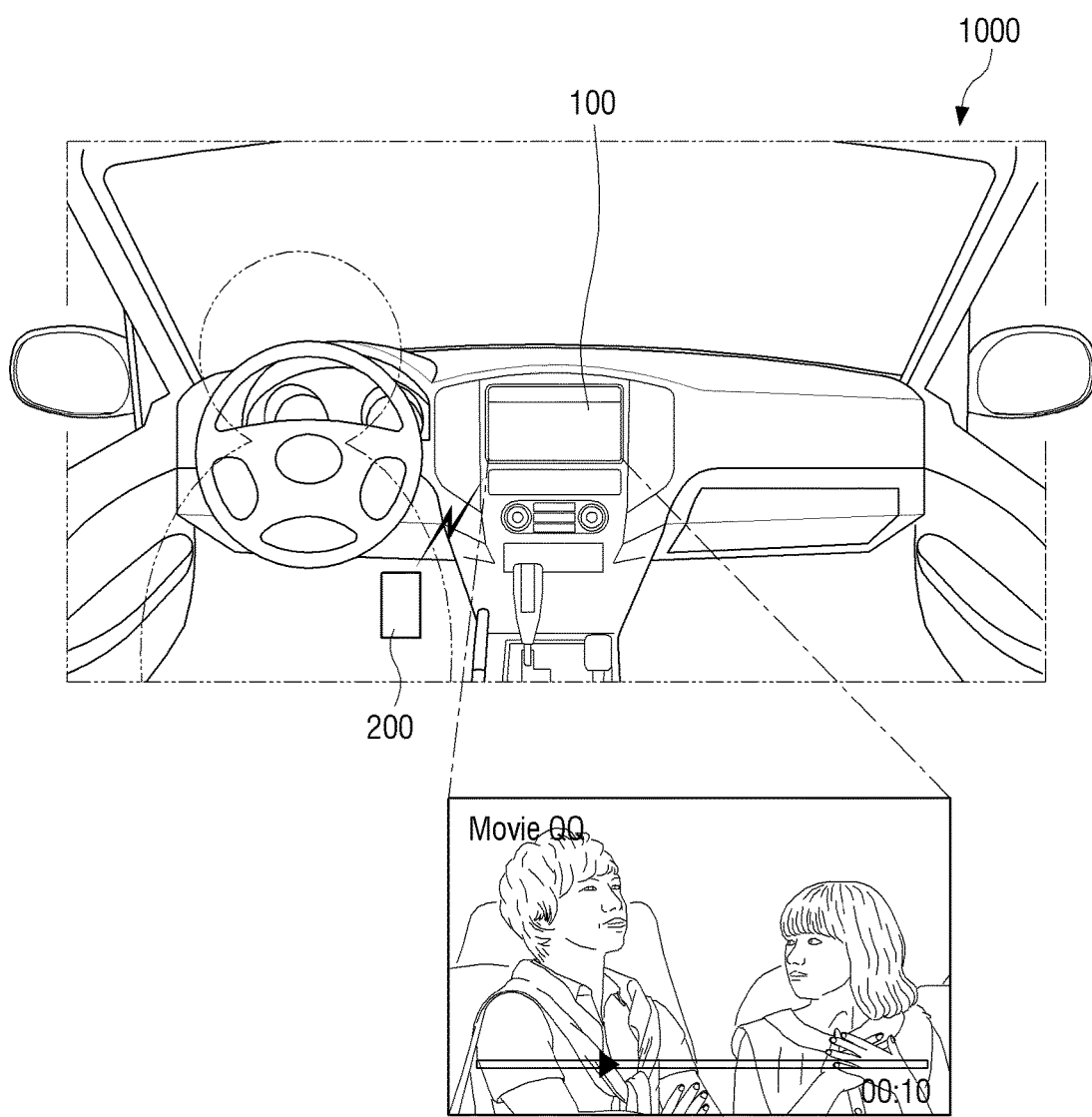
FIG. 17 illustrates an exemplary embodiment in which the mobile device and the display device are connected to a vehicle according to an exemplary embodiment.

FIG. 17 illustrates an exemplary embodiment in which the mobile device and the display device are connected to a vehicle according to an exemplary embodiment.

In FIG. 17, the display device 100 and the mobile device 200 are connected to each other in the vehicle in a wireless communication method. The display device 100 and the mobile device 200 may also be connected via a cable. In FIG. 17, the display device 100 is built in the vehicle. However, it is also possible that the display device 100 exists independently and is attachable to or detachable from the vehicle. In addition, although not shown in FIG. 17, the display device 100 may be connected to an ECU of the vehicle.

If the display device 100 and the mobile device 200 are connected to each other as shown in FIG. 17, the mobile device 200 transfers received calls, messages, or data to the display device 100. If the ECU (not shown) is connected to the display device 100, the ECU transfers information on the vehicle to the display device 100. The display device 100 displays diverse data received from the mobile device 200 or the ECU.

The display device 100, the mobile device 200, or the ECU figures out a location of the vehicle using their GPS chips. That is, location information of the display device 100, location information of the mobile device 200, or location information of the ECU may be considered the location of the vehicle.

Additional information found by the server 400 may be transferred to the display device 100 through the mobile device 200. The display device 100 displays the received additional information. For example, if the server 400 searches for advertisement information related to movie QQQ, the advertisement information of movie QQQ is transferred through the mobile device 200 to the display device 100. The display device 100 displays the advertisement information of movie QQQ.

In the example of FIG. 17, the single mobile device 200 of the driver is connected to the display device 100. However, if a plurality of passengers in the vehicle have their own mobile devices, the display device 100 may be connected to the plurality of mobile devices in the vehicle using a local wireless communication method. At this time, if the display device 100 receives advertisement information, the display device 100 may transfer the advertisement information to the plurality of mobile devices.

As described above, additional information such as advertisement information may be transferred to an external display device 500.

Figure 18:
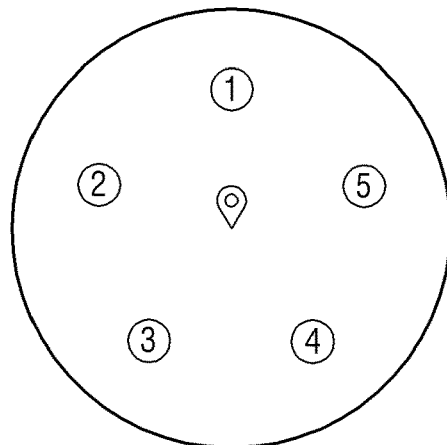
FIG. 18 illustrates a method for providing a service to a plurality of terminal devices according to an exemplary embodiment.
Figure 18:
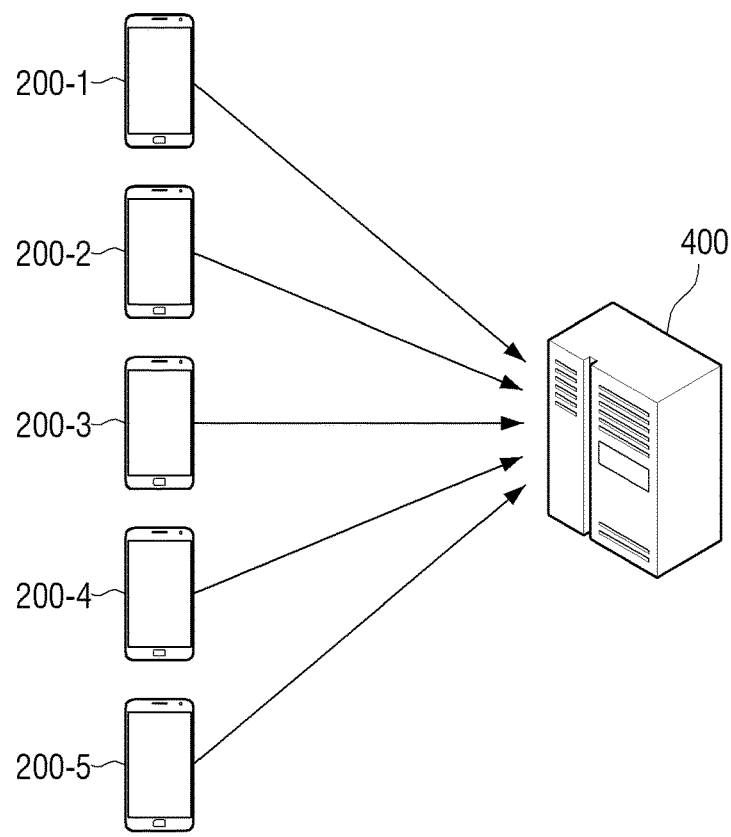

FIG. 18 illustrates a method for providing a service to a plurality of terminal devices according to an exemplary embodiment.

With reference to (1) of FIG. 18, there are five users around a single external display device 500. Location information of the users may be searched using GPS information. In general, people have their own mobile devices, so location information of the mobile device 200 can be the same as that of the users.

With reference to (2) of FIG. 18, if a plurality of users call different people, call conversation and location information of the plurality of users are transmitted to the server 400. The server 400 categorizes users to share the same external display device 500 based on the location information. The server 400 extracts a call keyword from call conversations of the categorized users. The server 400 may extract call keywords with priority according to the users. In this case, different advertisement information for each user may be found. Or, the server 400 may consider call conversations of the entire users as one and extract call keywords with priority from the call conversations of the entire users. In this case, a plurality of pieces of advertisement information related to a call conversation of a single user may be found.

The server 400 may transfer the found advertisement information to mobile devices 200-1, 200-2, 200-3, 200-4, and 200-5 of the users, or transfer the plurality of pieces of advertisement information to the external display device 500 adjacent to the plurality of users.

Advertisement information may be transferred in the order of advertisement information having the highest priority and/or in the order of a terminal device of a user who hangs up the phone the most briefly.

Until now, the process of detecting current state information using the mobile device 200 and transferring a message conveniently, and the process of transferring call conversation and location information to the server 400 and receiving advertisement information related to a call keyword and the location information have been described. Meanwhile, the mobile device 200 is connected to the display device 100, and the display device 100 may be connected to an ECU (not shown) of a vehicle. The display device 100 may be connected to the ECU using a controller area network (CAN).

Figure 19:
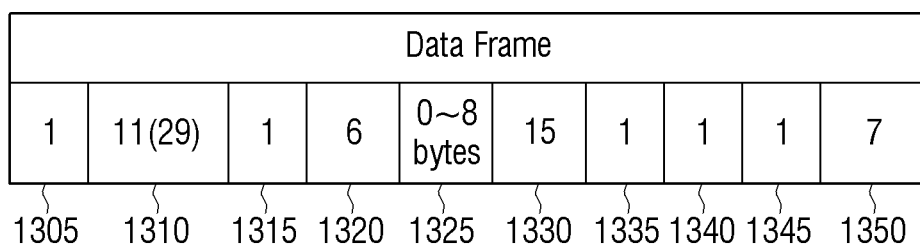
FIG. 19 illustrates a data frame format of a controller area network (CAN) according to an exemplary embodiment.

FIG. 19 illustrates a data frame format of a CAN according to an exemplary embodiment.

The CAN indicates a network system for a vehicle to provide digital serial communication between diverse measuring control devices of a vehicle. Complex electric wiring and relay of electronic components in a vehicle are replaced with a serial communication line so that weight and complexity can be reduced. In addition, presence or absence of abnormality caused by electronic interference can be diagnosed.

The CAN is a standard of a multimaster broadcast serial bus to connect the ECU. Each node may transfer or receive a message, but each node may transfer or receive a message at the same time. A message includes an identification (ID) for indicating a priority order of the message of up to 8 bytes. Devices which are connected to the CAN are generally sensors, actuators, and other control devices. Such devices are not directly connected to a bus, but are connected through a host processor and a CAN controller.

A CAN protocol includes a physical layer, a transfer layer, an object layer, and an application layer, as in other network protocols. The CAN may be set in two different message (or frame) formats. A general frame supports 11 bits of identifier, and an extension frame supports 29 bits of identifier.

With reference to FIG. 19, a CAN data frame format includes 1 bit of start of frame field 1305, 11 bits or 29 bits of identifier field 1310, 1 bit of remote transmission request (RTR) field 1315, 6 bits of control field 1320, 0 to 8 bytes of data field 1325, 15 bits of cyclic redundancy checking (CRC) field 1330, 1 bit of CRC delimiter field 1335, 1 bit of ACK slot 1340, 1 bit of ACK delimiter field 1345, and 7 bits of end of frame field 1350.

The start of frame field 1305 indicates a start of a transferred frame. The identifier field 1310 is for data representing a message priority order. When two nodes transfer a message at the same time, the order is determined according to a priority order of the identifier field 1310. When the RTR field 1315 is 0, a data frame is dominant, and when the RTR field 1315 is 1, a remote frame is recessive. The remote frame is a frame which is output when a receiver requests data from a transmitter.

The control field 1320 includes 1 bit of identifier extension bit (IDE) field, 1 bit of reserved bit field, and 4 bits of data length code field. The data field 1325 contains data to transfer. The CRC field 1330 checks an error by separating a predetermined section of bits. If the ACK slot 1340 is 1, the transmitter transmits a recessive state.

The CRC delimiter field 1335, the ACK delimiter field 1345, and the end of frame field 1350 become 1 in the recessive state.

As described above, communications in the ECU is enabled using the CAN, and state information of the vehicle can be transferred to the display device 100, such as the head unit of the vehicle.

Flow charts of a method for providing a service are described.

Figure 20:
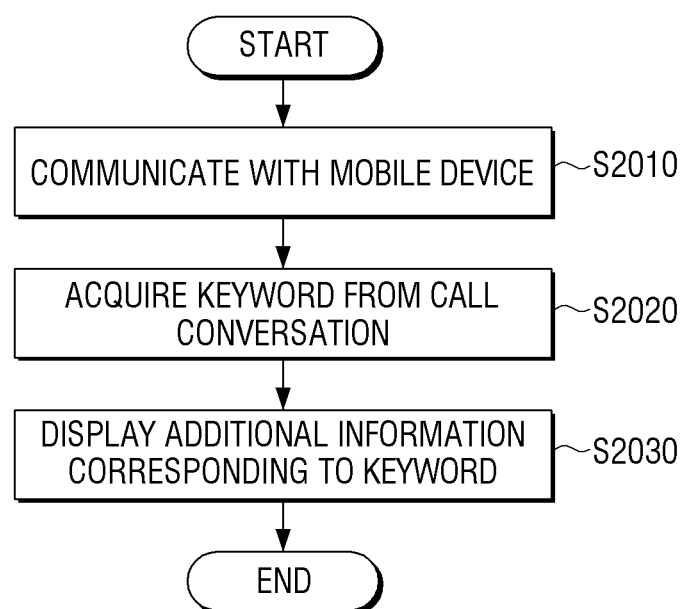
FIG. 20 is a flow chart illustrating a method for providing a service using a display device according to an exemplary embodiment.

FIG. 20 is a flow chart illustrating a method for providing a service using a display device according to an exemplary embodiment.

In operation S2010, a display device communicates with a mobile device. The display device receives a call signal from the mobile device, and requests the mobile device to make a call or transfer a message. The display device may be connected to the mobile device via a cable or wirelessly.

In operation S2020, the display device acquires a keyword included in a call conversation. The display device may acquire a keyword from an audio signal including the call conversation. Alternatively, the display device converts the audio signal into text and acquires a keyword from the converted text. In some cases, the display device may receive a keyword extracted by the mobile device or a server.

In operation S2030, the display device displays additional information corresponding to the keyword. The display device searches at least one of its storage unit, the mobile device, and the server. The additional information is displayed with the keyword. The keyword may be a person's name, a place name, a movie, time, advertisement, etc. The additional information may be a phone number, a photograph, an address, advertisement information, multimedia content, etc. If one of the displayed additional information is selected, the display device provides a corresponding service.

Figure 21:
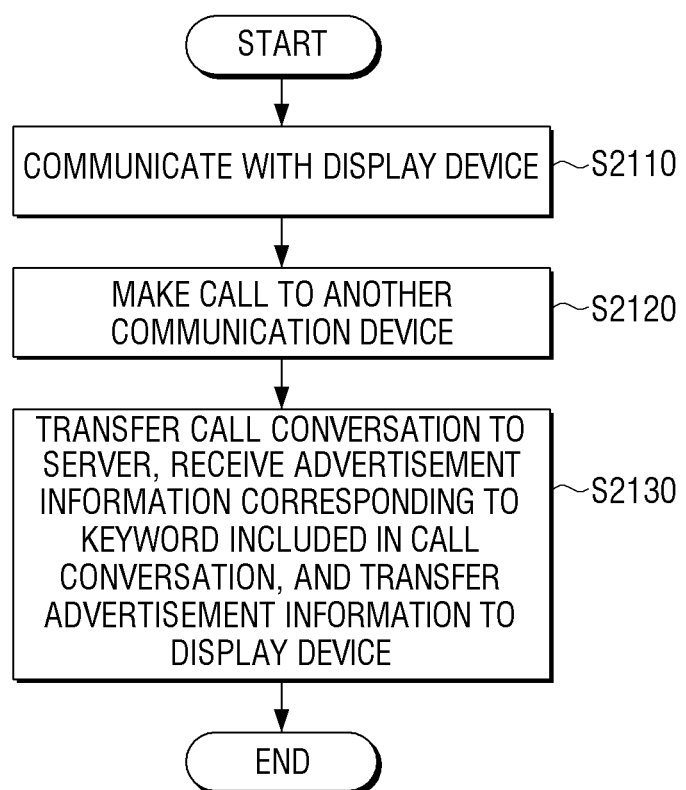
FIG. 21 is a flow chart illustrating a method for providing a service using a mobile device according to an exemplary embodiment.

FIG. 21 is a flow chart illustrating a method for providing a service using a mobile device according to an exemplary embodiment of the present invention.

In operation S2110, a mobile device communicates with a display device. In operation S2120, the mobile device makes a call to another communication device. The mobile device receives a call signal from the communication device and transfers the call signal to the display device. If call connection is selected on the display device, the mobile device transfers a call conversation to the display device.

In operation S2130, the mobile device transfers the call conversation to a server, receives advertisement information corresponding to a keyword included in the call conversation, and transfers the advertisement information to the display device. If the mobile device transfers the call conversation to the server, the server may store the call conversation in a corresponding personal profile and extract a keyword from the call conversation. The server searches for additional information related to the keyword and transfers the found additional information to the mobile device. The mobile device receives the advertisement information and transfers the advertisement information to the display device.

The method for providing a service using the display device according to the diverse exemplary embodiments may be implemented in a program and be provided to a terminal device.

For example, a program capable of communicating with a mobile device, acquiring a keyword from a call conversation if the mobile device makes a call, and displaying additional information corresponding to the keyword may be stored in a non-transitory computer readable medium.

A non-transitory computer readable medium is a medium which does not store data temporarily such as a register, cash, and memory but stores data semi-permanently and is readable by devices. More specifically, the aforementioned diverse applications or programs may be stored and provided in a non-transitory computer readable medium such as a compact disk (CD), digital video disk (DVD), hard disk, Blu-ray disk, universal serial bus (USB), memory card, and read-only memory (ROM).

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display device which is provided at a vehicle, the display device comprising:
   a display;
   a communicator configured to communicate with a mobile device; and
   a controller configured to:
   control the display to display a first screen to guide a first route corresponding to a navigation function in an entire area of the display,
   in response to a call signal being received from the mobile device, display the first screen in a first area of the display and display a content corresponding to the call signal in a second area of the display,
   in response to a call being connected by the call signal, obtain at least one keyword in a conversation of the call,
   in response to the call being disconnected, control the display to display additional information corresponding to the obtained keyword, the additional information including location information,
   in response to the location information being selected among the additional information, control the display to display a first UI and a second UI corresponding to the location information,
   in response to the first UI being selected, control the display to display a second screen to guide a second route corresponding to the location information, the second route being different from the first route, and
   in response to the second UI being selected, provide a call service corresponding to the location information by communicating with the mobile device.

2. The display device as claimed in claim 1, wherein the controller is further configured to obtain the at least one keyword in the conversation and control the display to display the additional information corresponding to the obtained keyword.

3. The display device as claimed in claim 2, wherein the additional information comprises advertisement information corresponding to the obtained keyword,
   wherein if a server configured to store an advertisement database transfers the advertisement information corresponding to the obtained keyword, the communicator is configured to receive the transferred advertisement information through the mobile device, and
   wherein the controller is configured to control the display to display the received advertisement information.

4. The display device as claimed in claim 2, wherein if the displayed additional information is selected, the controller is configured to provide a service corresponding to the selected additional information.

5. The display device as claimed in claim 4, wherein the additional information further comprises at least one from among contact information, multimedia content, and advertisement information, and
   wherein if the contact information is selected, the controller is configured to provide a call service for making a call related to the contact information,
   if the multimedia content is selected, the controller is configured to provide a service for reproducing the multimedia content, and
   if the advertisement information is selected, the controller is configured to provide an advertisement service for displaying a third screen including the advertisement information.

6. The display device as claimed in claim 2, further comprising:
   a storage,
   wherein the controller is configured to search for the additional information corresponding to the obtained keyword from among information which is stored in at least one of a server, the mobile device, another mobile device which is connected to the mobile device, and the storage.

7. The display device as claimed in claim 2, wherein if the conversation of the mobile device is received through the communicator, the controller is configured to acquire the obtained keyword from the conversation and search for the additional information based on the obtained keyword.

8. The display device as claimed in claim 2, wherein the controller is configured to control to search for the additional information corresponding to the obtained keyword from among information which is stored in only another mobile device which is connected to the mobile device.

9. A method for providing a service using a display device, the method comprising:

communicating with a mobile device;

displaying a first screen to guide a first route corresponding to a navigation function in an entire display area;

in response to a call signal being received from the mobile device, displaying the first screen in a first area among the entire display area and a content corresponding to the call signal in a second area among the entire display area;

in response to a call being connected by the call signal, obtaining at least one keyword in a conversation of the call;

in response to the call being disconnected, displaying additional information corresponding to the obtained keyword, the additional information including location information;

in response to the location information being selected among the additional information, displaying a first UI and a second UI corresponding to the location information;

in response to the first UI being selected, displaying a second screen to guide a second route corresponding to the location information, the second route being different from the first route; and in response to the second UI being selected, providing a call service corresponding to the location information by communicating with the mobile device.

10. The method as claimed in claim 9, further comprising: obtaining the at least one keyword in the conversation.

11. The method as claimed in claim 10, wherein the additional information comprises advertisement information corresponding to the obtained keyword, and the method further comprising:

if a server which stores an advertisement database transfers the advertisement information corresponding to the obtained keyword, receiving the transferred advertisement information through the mobile device, and displaying the received advertisement information.

12. The method as claimed in claim 10, further comprising:

if the displayed additional information is selected, providing a service corresponding to the selected additional information.

13. The method as claimed in claim 12, wherein the additional information further comprises at least one from among, contact information, multimedia content, and advertisement information, and in the providing of the service, if the contact information is selected, a call service for making a call related to the contact information is provided, if the multimedia content is selected, a service for reproducing the multimedia content is provided, and if the advertisement information is selected, an advertisement service for displaying a third screen including the advertisement information is provided.

14. The method as claimed in claim 10, further comprising:

searching for the additional information corresponding to the obtained keyword from among information which is stored in at least one of a server, the mobile device, another mobile device which is connected to the mobile device, and a storage.

15. The method as claimed in claim 10, further comprising:

if the conversation of the mobile device is received, extracting and obtaining the at least one keyword from the conversation and searching for the additional information based on the obtained keyword.

16. The method for providing a service using a display device as claimed in claim 10, wherein the display device searches for the additional information corresponding to the obtained keyword from among information which is stored in only another mobile device which is connected to the mobile device.

* * * * *